(12) United States Patent
Chassen et al.

(10) Patent No.: US 12,093,518 B2
(45) Date of Patent: Sep. 17, 2024

(54) ELECTRONIC PICTURE CAROUSEL

(71) Applicant: Spintura, Inc., New York, NY (US)

(72) Inventors: David J. Chassen, New York, NY (US); Armann Kojic, Los Gatos, CA (US)

(73) Assignee: Spintura, Inc., New York, NY (US)

( * ) Notice: Subject to any disclaimer, the term of this patent is extended or adjusted under 35 U.S.C. 154(b) by 2 days.

(21) Appl. No.: 16/684,551

(22) Filed: Nov. 14, 2019

(65) Prior Publication Data

US 2020/0159394 A1    May 21, 2020

Related U.S. Application Data

(60) Provisional application No. 62/768,000, filed on Nov. 15, 2018.

(51) Int. Cl.
*G06F 3/04845* (2022.01)
*G06F 3/04883* (2022.01)
*G06F 16/54* (2019.01)

(52) U.S. Cl.
CPC ...... *G06F 3/04845* (2013.01); *G06F 3/04883* (2013.01); *G06F 16/54* (2019.01)

(58) Field of Classification Search
CPC .... G06F 3/04817; G06F 3/0482; G06F 16/44; G06T 13/80
See application file for complete search history.

(56) References Cited

U.S. PATENT DOCUMENTS

| | | | | |
|---|---|---|---|---|
| 5,485,197 A | * | 1/1996 | Hoarty | G06F 3/04815 345/649 |
| 5,515,486 A | * | 5/1996 | Amro | G06T 3/60 715/848 |
| 5,689,667 A | * | 11/1997 | Kurtenbach | G06F 3/0482 715/810 |
| 8,806,363 B1 | * | 8/2014 | Sonawala | G06F 3/0481 715/779 |
| 2002/0054164 A1 | * | 5/2002 | Uemura | G11B 27/34 715/848 |
| 2004/0233239 A1 | * | 11/2004 | Lahdesmaki | G09G 5/003 715/810 |
| 2006/0048076 A1 | * | 3/2006 | Vronay | G06F 16/904 715/850 |
| 2007/0136681 A1 | * | 6/2007 | Miller | G06F 3/04817 715/782 |
| 2007/0277126 A1 | * | 11/2007 | Park | G06F 3/04883 715/866 |

(Continued)

*Primary Examiner* — Jennifer N Welch
*Assistant Examiner* — Amy P Hoang
(74) *Attorney, Agent, or Firm* — David Lewis

(57) ABSTRACT

A system for viewing pictures is disclosed having a carousel behavior in which there are different carousels that spin about axes oriented in different directions. Swiping the screen in the direction of rotation of one of the carousels causes the carousel to spin and advance an image. Border panels may be provided. Each border panel may be associated with a different location or category, and the user may send the picture to a particular destination and/or category by swiping the picture towards the relevant panel. The panels may provide a preview for adjacent pictures or frames. An object, such as an enhanced reality object, may be pinned to images and are viewable in the preview panels.

22 Claims, 27 Drawing Sheets

(56) References Cited

U.S. PATENT DOCUMENTS

| | | | | |
|---|---|---|---|---|
| 2008/0141172 | A1* | 6/2008 | Yamamoto | H04N 21/4438 |
| | | | | 715/835 |
| 2008/0295037 | A1* | 11/2008 | Cao | G06F 3/0482 |
| | | | | 715/852 |
| 2013/0047123 | A1* | 2/2013 | May | G06F 3/04817 |
| | | | | 715/834 |
| 2013/0132904 | A1* | 5/2013 | Primiani | G06F 3/0482 |
| | | | | 715/834 |
| 2013/0191784 | A1* | 7/2013 | Noto | G06F 3/04883 |
| | | | | 715/834 |
| 2014/0298263 | A1* | 10/2014 | Maeda | G06F 3/04886 |
| | | | | 715/828 |
| 2015/0172534 | A1* | 6/2015 | Miyakawa | H04N 23/80 |
| | | | | 348/222.1 |
| 2016/0026371 | A1* | 1/2016 | Lu | G06F 3/04842 |
| | | | | 715/768 |
| 2016/0117072 | A1* | 4/2016 | Sharifi | G06F 9/543 |
| | | | | 715/769 |
| 2016/0291846 | A1* | 10/2016 | DeWeese | G06T 1/20 |
| 2016/0291848 | A1* | 10/2016 | Hall | G06F 3/04847 |
| 2017/0126689 | A1* | 5/2017 | Lloyd | G06F 3/04817 |
| 2017/0230576 | A1* | 8/2017 | Sparks | H04N 5/23238 |
| 2018/0067641 | A1* | 3/2018 | Lerner | H03M 7/30 |
| 2018/0292955 | A1* | 10/2018 | Fakhouri | G06F 3/0482 |
| 2020/0264695 | A1* | 8/2020 | Sanjoto | H04N 5/23238 |

* cited by examiner

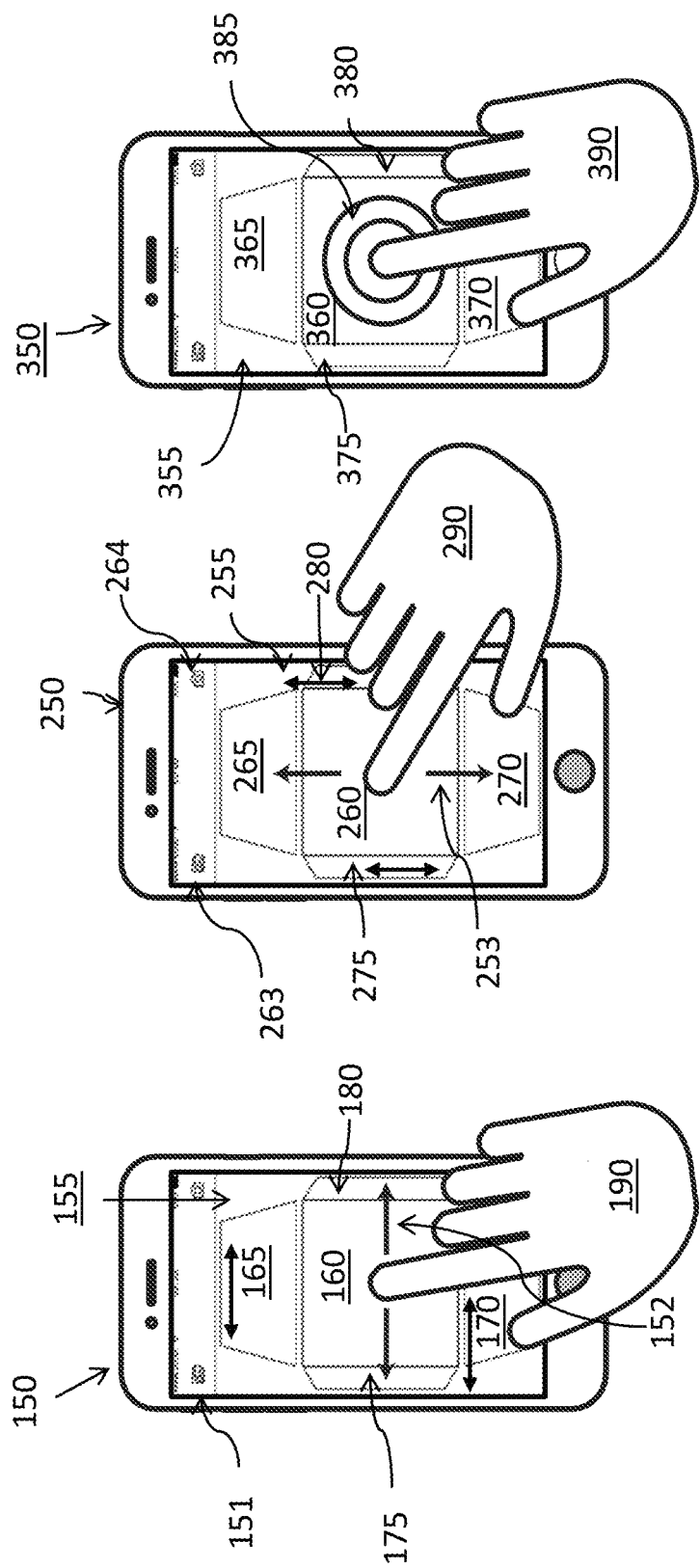

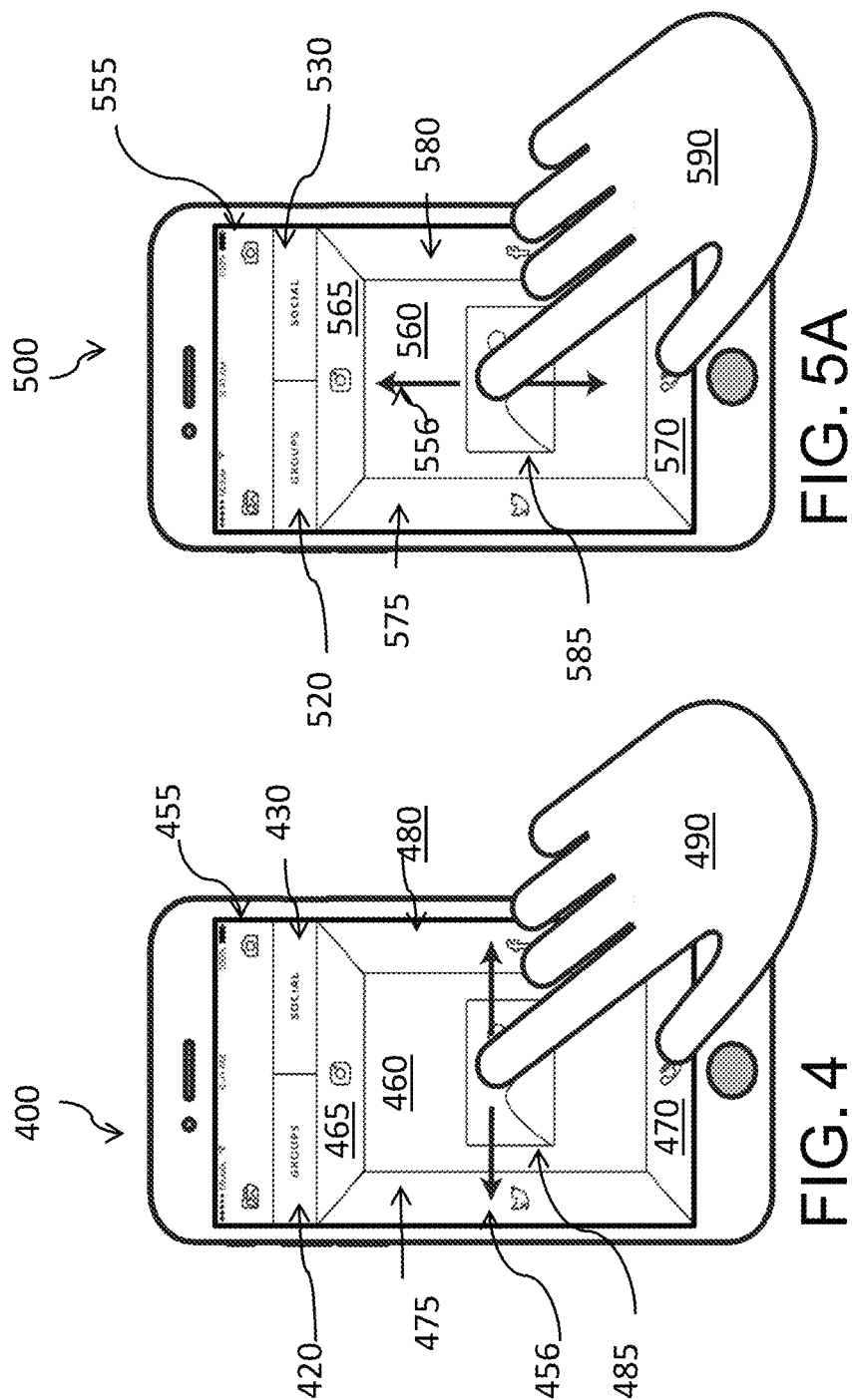

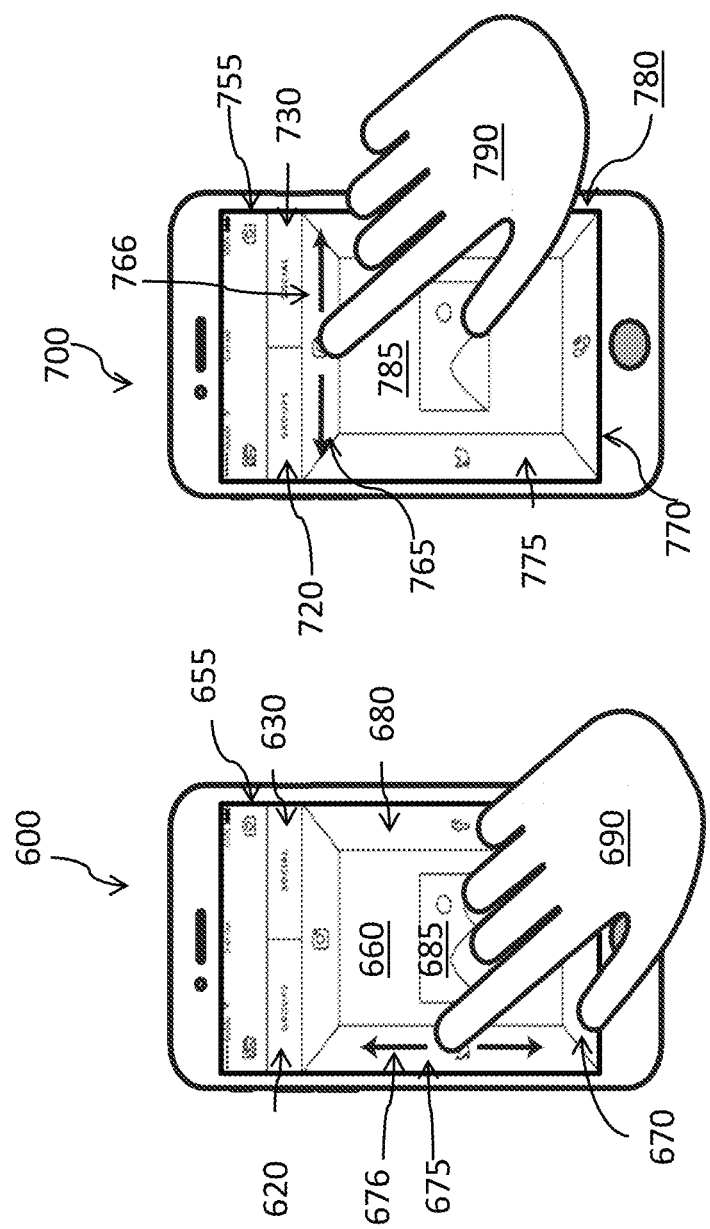

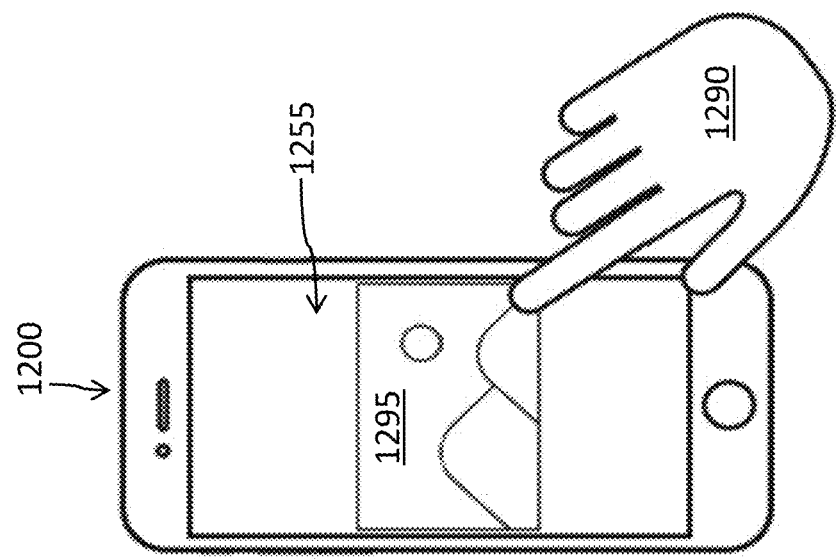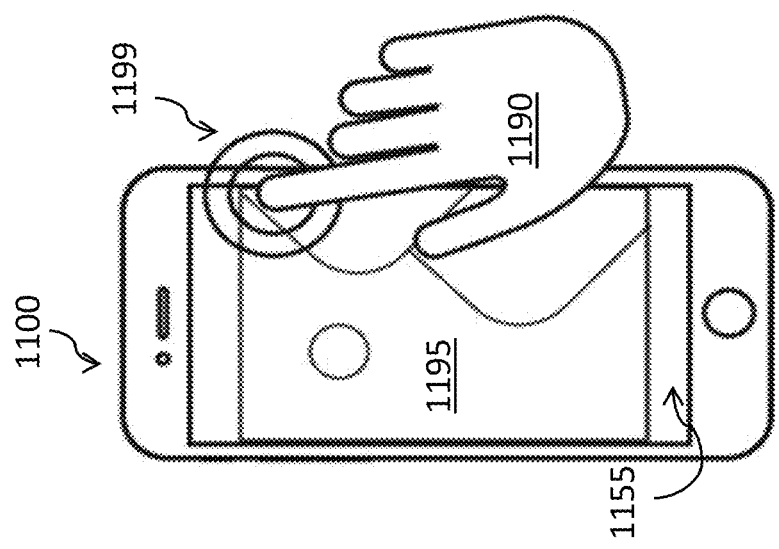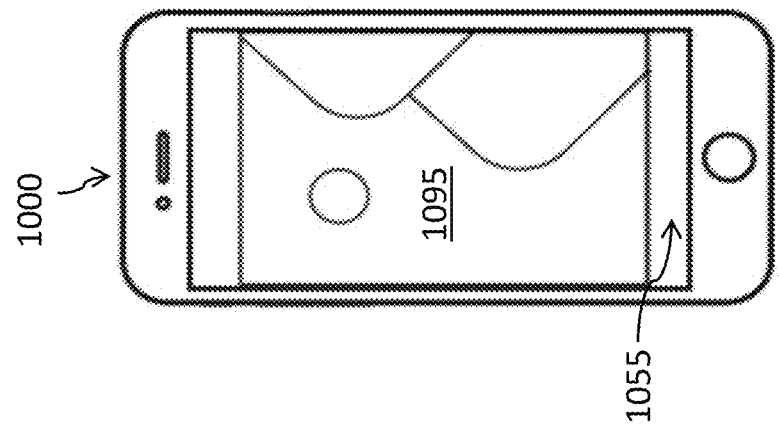

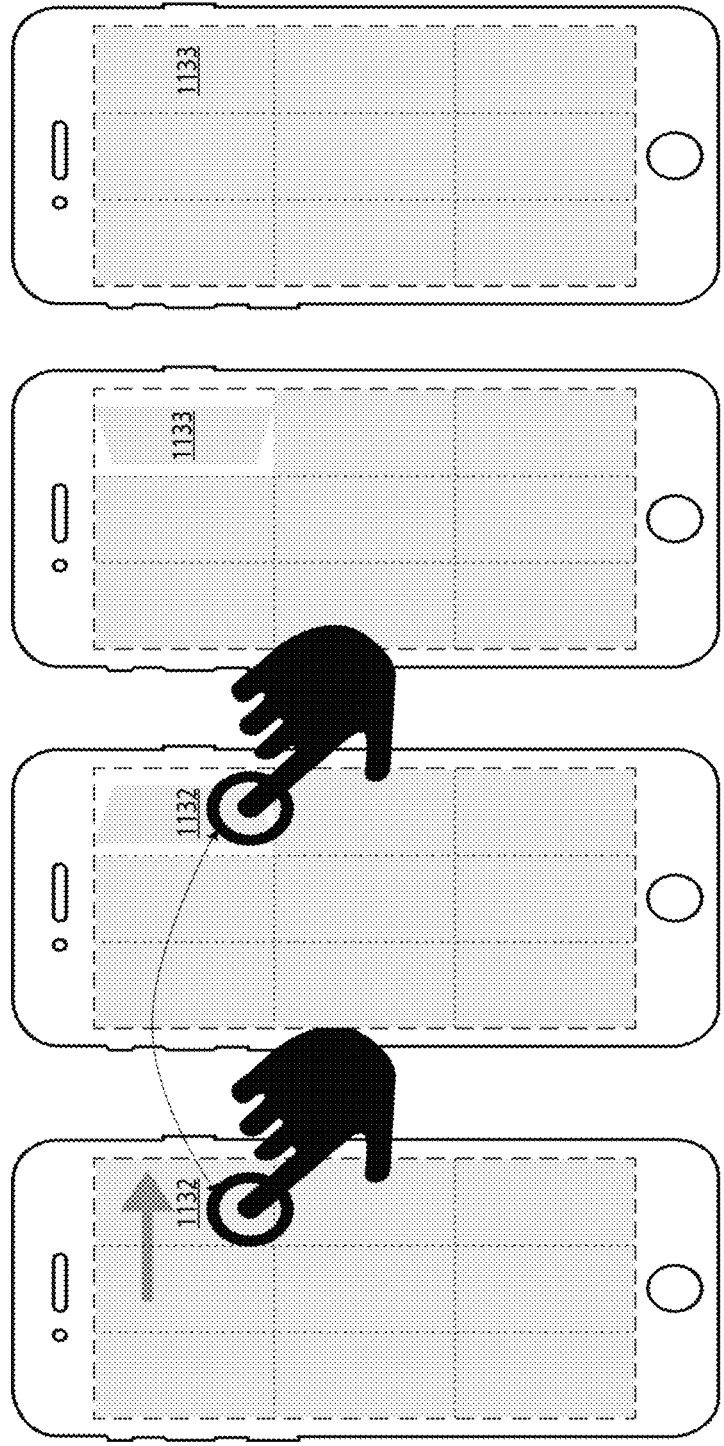

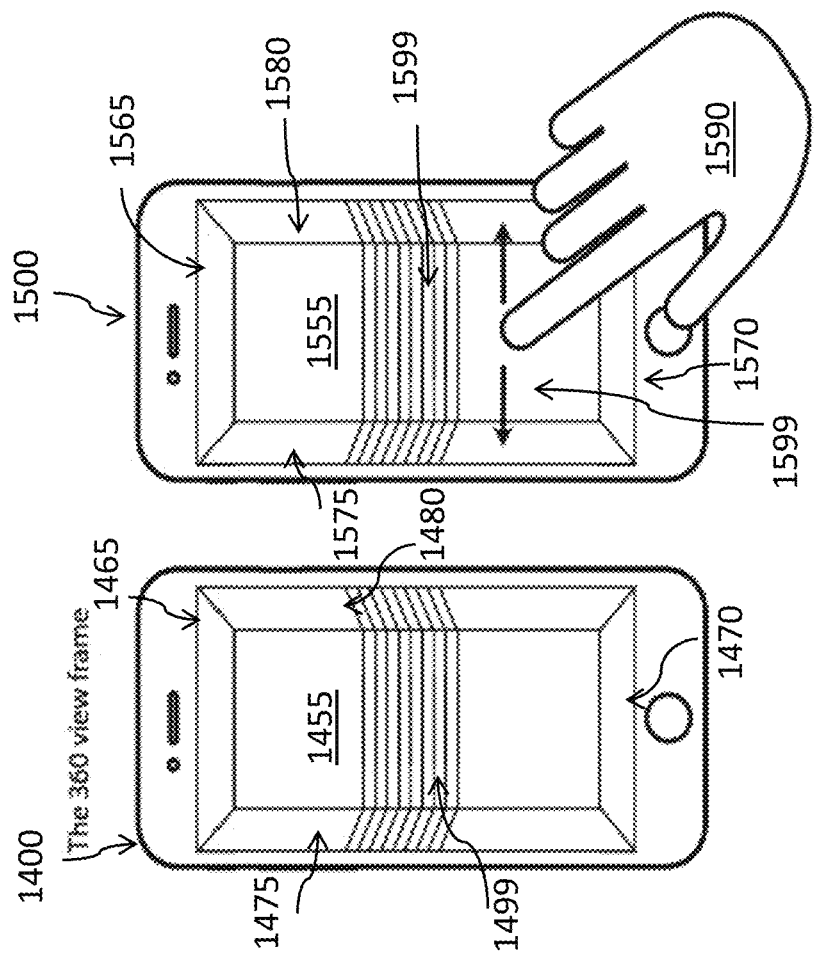
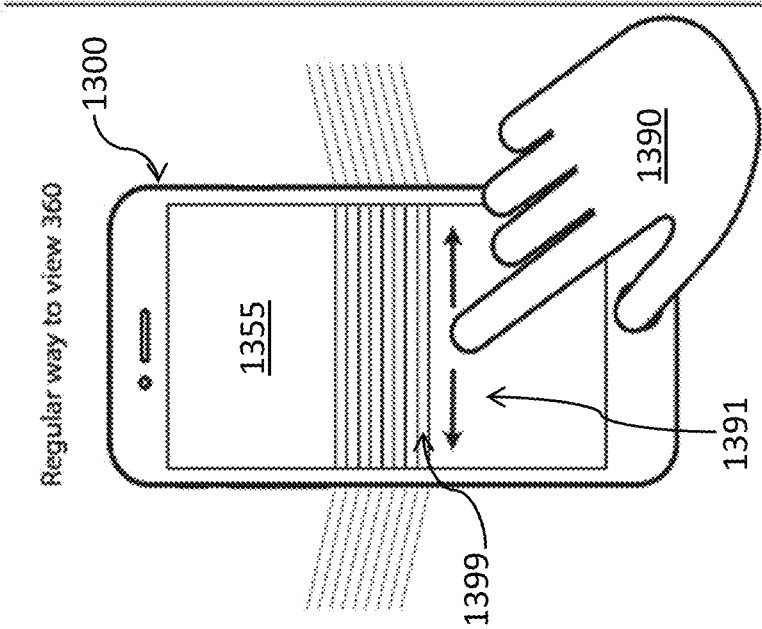
FIG. 15
FIG. 14
FIG. 13

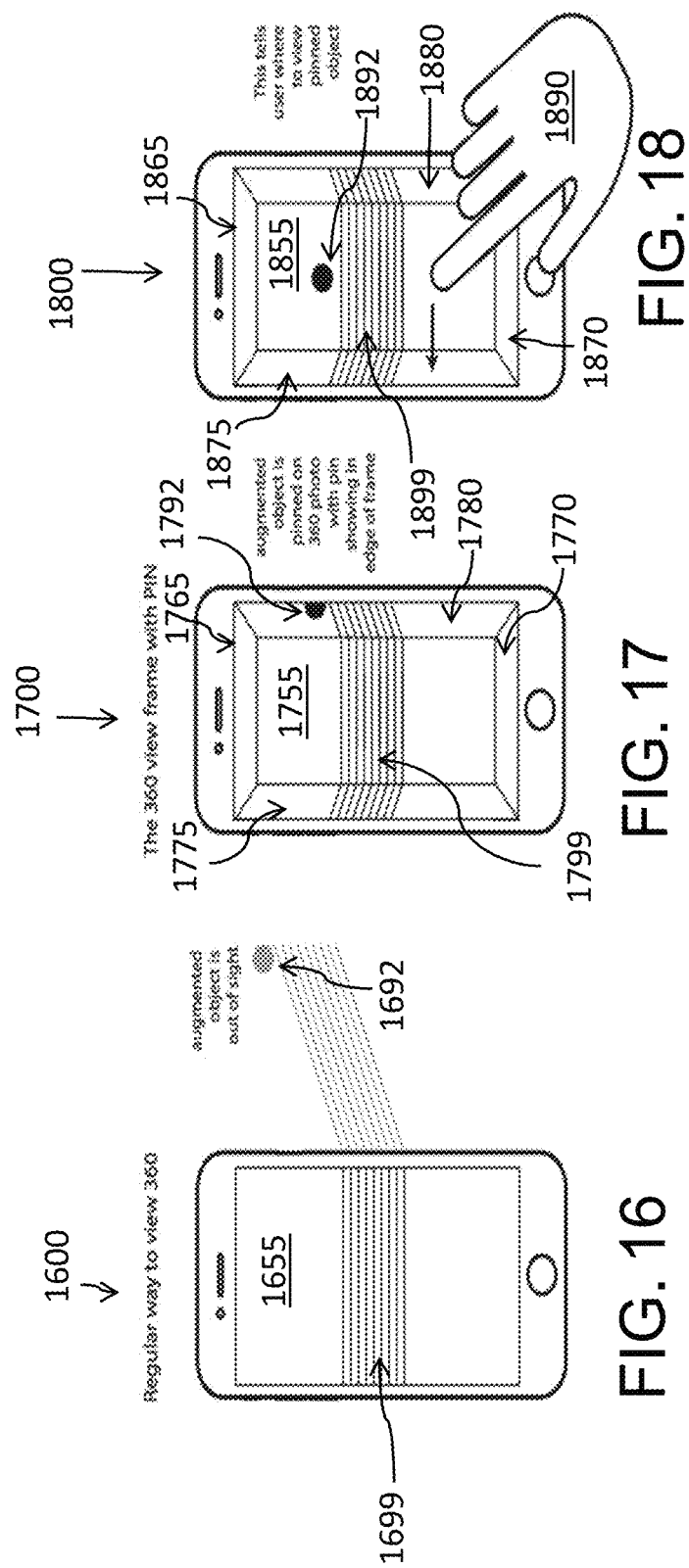

ELECTRONIC PICTURE CAROUSEL

CROSS-REFERENCE TO RELATED APPLICATIONS

This application claims priority to U.S. Provisional Patent Application No. 62/768,000 (Docket # CV-1), filed Nov. 15, 2018, by David J. Chassen, entitled, "Electronic Picture Carousel," herein incorporated by reference in its entirety.

FIELD

This specification generally relates to a method and system for viewing pictures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

In prior art methods of viewing pictures it can be difficult to find a desired picture. In prior art methods, it may be difficult retrieve and then send pictures to a desired destination.

BRIEF DESCRIPTION OF THE FIGURES

In the following drawings, like reference numbers are used to refer to like elements. Although the following figures depict various examples of the invention, the invention is not limited to the examples depicted in the figures.

FIG. 1B shows the layout of frames according to an embodiment and FIG. 1B shows a diagram of an example of a horizontal spin swipe.

FIG. 2 shows a diagram of an example of a vertical spin swipe.

FIG. 3 shows a diagram of an example of selecting an image.

FIG. 4 shows a diagram of an embodiment of a horizontal swipe to send subject matter to a destination and/or categorize content.

FIG. 5A shows a diagram of an embodiment of a vertical swipe to send subject matter to a destination and/or categorize content.

FIG. 6 shows a diagram of an embodiment of right handed vertical single border swipe/rotation bordering a swipe frame.

FIG. 7 shows a diagram of an embodiment of right handed horizontal single border swipe/rotation surrounding a swipe frame.

FIG. 10 shows a diagram of an example of an image just before being rotated.

FIG. 11 shows a diagram of an example of the user tapping and/or touching a corner of the image, just before rotating the image.

FIG. 12A shows a diagram of an example the image after being rotated 90 degrees by the user.

FIGS. 12B-G show an example of a partial pole spin.

FIGS. 12H-J show one of two examples of a pole spin.

FIGS. 12O-R show an example of a pole spin in which only one tile of a grid is spun.

FIG. 13 shows a diagram of an embodiment of the manner in which panoramic pictures may be viewed.

FIG. 14 shows a diagram of an embodiment of a manner of viewing panoramic pictures in which the borders show a preview of frames adjacent to the picture currently being viewed.

FIG. 15 shows a diagram of an embodiment of a manner of swiping between frames of a panoramic picture.

FIG. 16 shows a diagram of an embodiment of an enhanced reality object pinned to an image, where enhanced reality image is on an adjacent image that the user cannot see without border previews.

FIG. 17 shows a diagram of an embodiment of an enhanced reality object pinned to an image whose preview is viewable in a border panel of the current image.

FIG. 18 shows a diagram of an embodiment of an image in the main frame of the display, which has an enhanced reality image pinned to the picture.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-30 is a brief description of each element, which may have no more than the name of each of the elements in the one of FIGS. 1-30 that is being discussed. After the brief description of each element, each element is further discussed in numerical order. In general, each of FIGS. 1-30 is discussed in numerical order and the elements within FIGS. 1-30 are usually discussed in numerical order to facilitate easily locating the discussion of a particular element. Nonetheless, there is no one location where all of the information of any element of FIGS. 1-30 is necessarily located. Unique information about any particular element or any other aspect of any of FIGS. 1-30 may be found in, or implied by, any part of the specification.

Figure 1A:
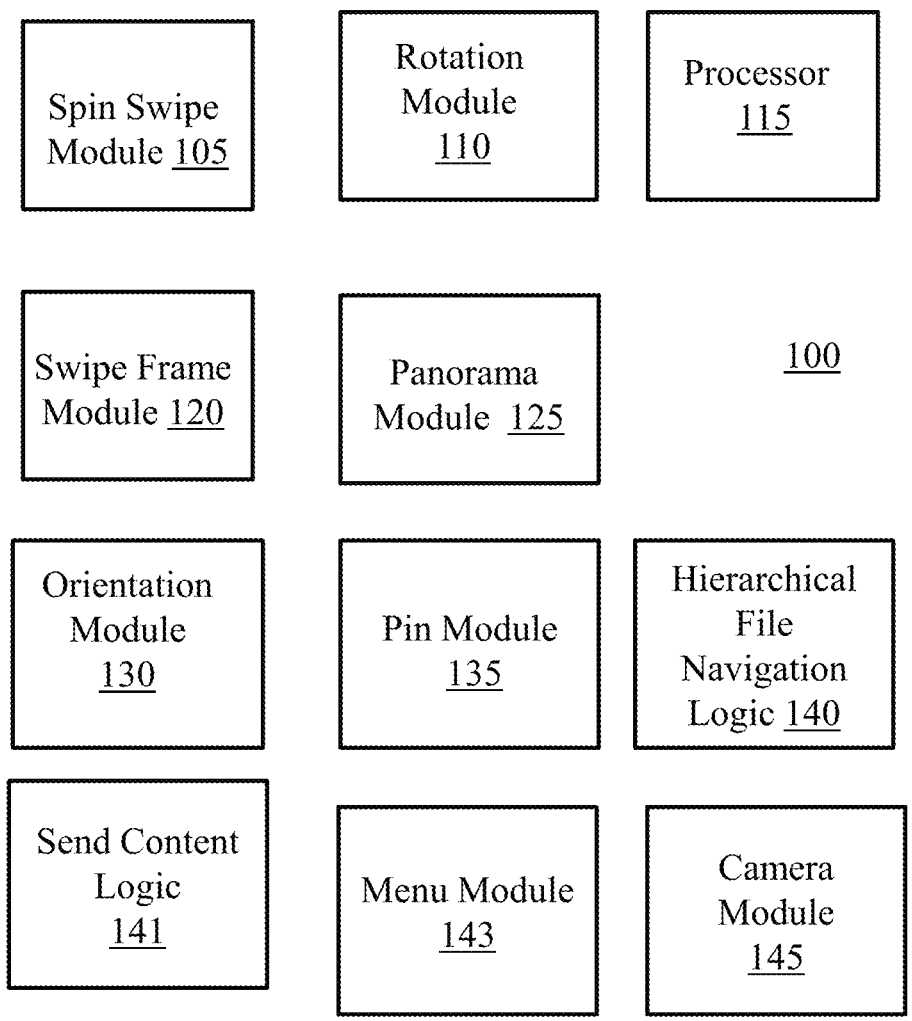
FIG. 1A shows a block diagram of an embodiment of a system for viewing images or other content.

FIG. 1A shows a block diagram of an embodiment of a system 100 for viewing and storing photos. The system 100 includes the various modules of the system, including a Spin Swipe Module 105, a Rotation Module 110, a Processor system 115, a Swipe Frame Module 120, a Panorama Module 125, an Orientation Module 130, and a Pin Module 135, Hierarchical File Navigation Logic 140, Send Content Logic 141, Menu Module 143, and Camera Module 145. In other embodiments, system 100 may not have all of the elements or features listed and/or may have other elements or features instead of or in addition to those listed.

The term "module" refers to lines of code, logic, or hardware that accomplishes a particular task. In this specification, the term "module" refers to a hardware unit, logical circuits, a module of computer code, and/or firmware, or any combination thereof. To construct electrical circuits and/or embodiments of the modules, the methods disclosed in U.S. Pat. No. 8,966,457 B2, which is incorporated herein by reference, and/or similar methods, may be used to convert the algorithms disclosed to electrical circuits. Any of the modules of this specification may be Application Specific Integrated Circuits (ASICs). The functions of the modules of FIG. 1A are described below.

In an embodiment, system 100 may be used for viewing and storing photos on a mobile device. The mobile device may be a tablet, smart phone, mobile phone, laptop, and/or handheld computer, for example. Optionally the methods and systems of this application may also be implemented on a stationary computer and/or image viewing system. In an embodiment of a system 100, intersecting x and y axes are used to scroll through a database of photos in the form of two carousels that are oriented so as to rotate/spin in directions perpendicular to one another. A carousel is a rotating machine or device like a merry-go-round which may have a circular shape, a cylindrical shape, or other shapes that are less round. The outside or perimeter of the carousel may contain multiple images and/or panels. The carousel may be oriented to spin vertically, horizontally, or in any direction such that the image or panel is seeable or readable to a user.

In system 100, the screen view of the images arranged in carousels provides a view of between one and nine images. In some embodiments of system, three images or five images are shown on the screen. However, the number of images is only confined by the size of the carousel, the size of the screen and/or the size of the images on the screen. In the screen views, when there are five or more images, the images are separated into a center, top, bottom, right, and left. The center image may be located in frame, and may be surrounded by the other four images. However, since the other four images may also be links, folders, symbols, icons, and words, the four surrounding borders can be thought of as borders, panels, or walls. If the border is only a single unit, the border can be interchangeably called a panel or wall. However, if the border is sectioned into multiple parts, each part can be described as a panel—and in that embodiment, the border may include multiple panels. The borders, panels, and/or walls may contain one or more images, links, folders, symbols, icons, text, and/or words.

The Spin Swipe Module 105 implements a spin swipe operation. The swipe that causes a spin is referred to as a "spin swipe" and is the combination of the spin and the swipe. In this specification, the words "swipe" and "push" are used interchangeably and either may substituted for the other wherever they occur to obtain different embodiments. The swipe alone is not referred to as the "spin swipe." In an embodiment, one swipe may advance the spin swipe through one or many images if desired. Both carousels, as a result of foreshortening of the images in the side panels, visually appear to fade into the distance at the four outer edges of the image, which are the right edge, left edge, top edge, and bottom edge. In some embodiments, if a carousel is spinning, the user may stop the carousel on the correct image or panel by touching any part of the spinning carousel and the Spin Swipe Module 105 implements the operation of stopping the carousel. In some embodiments, a swipe gesture in a second direction that is not parallel to the first direction can stop the carousel on the correct image or near the correct image and the Spin Swipe Module 105 implements the operation of stopping the carousel. Using the carousels facilitates accessing images faster.

The border swipe is a type of spin swipe, implemented by Spin Swipe Module 105. The border swipe is similar to a swipe frame (the swipe frame function is a swipe without a spin and may involve pushing content, such as an image to one area or another), except, instead of the image changing in response to a swipe, the selection that is indicated on the border panels changes. The spin swipe is illustrated by reference to FIGS. 1B-3, a method of viewing and storing photos on a mobile device in which intersecting x and y-axes are used to scroll through a database of photos in the form of two carousels that are oriented to rotate/spin perpendicular to one another. In some embodiments, if a border carousel is spinning, the user may stop the carousel on the correct image or panel by touching any part of the spinning carousel (e.g., a specific panel or image) and the Spin Swipe Module 105 implements the operation of stopping the carousel. In some embodiments, a swipe gesture in a second direction that is not parallel to the first direction can stop the carousel on the correct image or panel or near the correct image or panel and the Spin Swipe Module 105 implements the operation of stopping the carousel. The border swipe mode allows the user to store images faster or post images faster and with less effort.

Rotation Module 110 implements a rotation function. To activate a rotation function, a user may swipe a wall (or one of the border panels) of the frame top, bottom, left, or right. The rotation function causes all four walls of the frame to turn simultaneously, rotating the images in the border around an axis that is centered between the four walls. The border images may be foreshortened to give a visual impression that the image in the center is raised up with respect to the images on the border. To cause the rotation of the border image the user swipes or drags their finger along a border panel (or wall) in the direction of the length of the border panel (or wall). The swipe-frame-with-spin may be thought of as a spinning square or rectangular wheel (or wheel having another geometric shape) with the choices of buttons available on each wall changing so as to be synchronized with each ninety degree spin (see FIGS. 8 and 9 for examples of rotation functions). In some embodiments, the image in the center does not spin with the four walls of the frame. In some embodiments, the image in the center may spin with the four walls of the frame.

Processor system 115 performs any of the functions of any of the modules in FIG. 1. In some embodiments, processor system 115 is processor system 1908 (in FIG. 19, which is discussed below). Processor system 115 may perform any of the methods described in the specification.

Swipe Frame Module 120 implements the swipe frame function. The swipe frame function is a swipe without a spin and can involve pushing something (e.g., an image) to one area or another. The swipe frame function is discussed in more detail in FIGS. 4 and 5A. There are a variety of swipes, which may be implemented by Swipe Frame Module 120, that are included in the system of viewing an image that can change the view, move an image to another area (e.g., a social network), or move the view shown to another image. In other embodiments, a photo may be viewed and/or categorized on a mobile device using one of the borders of the frames of the image. For example, using the border, a user can quickly swipe a photo, such as a photo in the middle of the screen, pushing-swiping the photo towards a single destination and/or towards multiple destinations, (e.g., simultaneously, such as by using two fingers) without having to access additional buttons or lists of choices. Any function may be activated by selecting or swiping towards the border. The functions may include, but not limited to emailing the photo, sending the photo to a social network (e.g., Facebook or Twitter), adding the photo to a group or a folder, sending the photo to an application that allows the user to change the photo (e.g., add words, cut and paste, etc.). The swipe frame (of Swipe Frame Module 120) may also be used for selecting files and folders in combination with performing the spin swipe, via Spin Swipe Module 105. For example, the spin swipe, via Spin Swipe Module 105, may be used on a border row or column, and the swipe frame, via Swipe Frame Module 120, may be used to move the image or folder to the center box for more convenient viewing. The combination of swipe frame of Swipe Frame Module 120 and swipe frame with carousel walls is similar to a swipe frame except individual carousels each spin through multiple choices thus partially combining the two concepts—swipe frame and carousel walls. The carousel walls refer to the pane panels. Swipe frame with carousel walls may be part of the system for viewing a photo, in which a top pane panel and/or bottom pane panel are parts of carousels of different panes, and swiping the pane panel changes the pane panel to another pane panel. Swipe frame module 120 may be used to initial an instant message. For example, one of the border panels or carousel walls may be labeled "instant message," and swiping the center frame towards the instant message panel may open and page for writing and sending an instant message and/or may send the content that was previously in the center frame as an instant message to a chosen user.

Panorama Module 125 implements a 360-view frame or panorama (the panorama module is discussed further in conjunction with FIGS. 13-15). The panorama module 125 combines multiple frames to provide a panorama view of another multi-frame view. When implementing Panorama Module 125 a panoramic photo, still panoramic picture, or still panoramic image (e.g., or photo taken from multiple directions such as a 360 degree photo) can be viewed in a virtual perspective on a mobile device in a flat space. For example, the chosen photo may be split into sections, via Panorama Module 125, where the main part of the image is in the middle (and optionally, the user may spin swipe to place other parts of the image in the center). When the main part of the image is in the middle, the corresponding view or portion of the panoramic photo then appears around the edges (e.g., in the borders). In other words, when implementing Panorama Module 125, the rest of the view, or a part of the rest of the view, of "what is around the corner" is shown in the border frame in a peripheral view. The rest of the panoramic image is placed in the borders left and right as well as above and below creating a sense of perspective and depth, giving the user a feeling that part of what is contained within the image is located around the corner. The frames shown, via the Panorama Module 125, may be a virtual representation of what the user would see were the image an object being viewed via the lens of a camera and were the user to turn the mobile device around and face in a direction that is 90 degrees to the left or right (and/or up and down).

Orientation Module 130 implements a method by which a user may re-orient a photo on a mobile device from landscape to portrait or portrait to landscape. Optionally, Orientation Module 130 may place a button on one of the corners of a photo (or optionally elsewhere), which can be tapped and held in order to allow for a ninety degree spin around a center axis spinning the photo to the desired position. Optionally, no button appears, but the user may still just touch a corner of the image and drag the corner down or sideways for implementing the rotation caused by Orientation Module 130 (see FIGS. 10-12A for an example of implementation of an orientation function for rotating the image 90 degrees). In some embodiments of Orientation Module 130, the user taps or touches a corner of the image or selects a button to change the orientation. Any change in orientation may be implemented by Orientation Module 130, including, but not limited to, rotations of any degree (e.g., 1° through) 359°, flips along the x-axis, and flips along the y-axis.

Pin Module 135 implements the process of pinning. The 360 view frame may be augmented PINS (which may be implemented by the pin module, which optionally may be part of the panorama module 125). FIGS. 16-18 illustrate an embodiment of a method by which an augmented reality object (or label or other object) can be attached, by Pin Module 135, to a 360 photo or "pinned" to the image. The edge of the frame acts as a preview to both the photo "around the corner" as well as the PINNED augmented object (which is pinned to the image that is in the frame). The viewer is informed, by Pin Module 135, that there is an object in a certain direction as the object is "pinned" to the side frames.

That way, the user knows in which direction the user needs to spin the photo in order to find the augmented reality object. When the augmented reality object appears in the border panels, the user in essence sees a preview of the augmented reality object that may have been attached to the 360 photograph.

Hierarchical File Navigation Logic 140 implements the hierarchical arrangement of files and/or folders in the system for viewing an image. The system has the ability to search through a collection of images stored in a hand held device via panels in the system. In addition, there are options to search through icons, files, folders, directories, categories of images, hashtags, links to content, emojis, icon fonts, links to social media pages, and/or other objects via panels in the system. The hierarchical file navigation logic 140 implements the search through directories of images to find an image of choice via a directory of a particular type of image (e.g., family), a date and/or time, or some other aspect of an image in a directory (which may include files and/or folders that store images and/or other content). Further, the hierarchical file logic 140 navigation allows for searching through collections of social networks, etc. to find the desired social network.

Send Content Logic 141 implements the action of sending content, such as an image to a directory, a social network, an email application, a texting application or any location desired by the user that is allowed by the system for viewing an image.

Menu Module 143 implements a method, which when activated, causes a menu of currently available options to be displayed, and menu includes active links, which when selected implement a method corresponding to the menu item selected. Menu module 143 may include machine instructions, which when implemented, display options for searching and operating the menu. Links for activated menu module 143 may be provided when implementing system 100 and when viewing an image. Menu module 143 may also cause an icon to appear on a page of the application, which provides selectable link, via which the user may open the menu. The icon for the menu may be added in any part of the screen, however, in some embodiments, the icon is added in the menu bar for the user device. The menu options are discussed in more detail in conjunction with FIG. 23. The menu may provide the user with options and/or links for selecting the part of the application for setting up default options. In some embodiments, the menu module 143 provides the menu that presents to the user a choice of which mode the user would like to activate. In an embodiment, the menu module 143 is selectable at any time during use of the system for viewing an image.

Camera Module 145 may include a camera and/or a module that implements a method that controls a camera associated with the user device, which can be used to add images to the system for viewing an image. Camera Module 145 can be any type of camera. Camera Module 145 may include options presented to the user for immediately storing any image taken by the camera to one or more files and/or folders within the hierarchical arrangement of files and/or folders implemented by Hierarchical File Navigation Logic 140. For example, camera module 145 may store panoramic images as a series of frames that are stored as a sequence of frames for loading as a panorama view provided by panorama mode module 125.

Although the examples in the FIGs. show images in the each panel, any of the panels of FIGS. 1B-18 and 21-23 may include any type of content. For example, each panel may be any of a file, folder, directory, category of image, hashtag, a link to content, emoji, icon font, a link to a social media page, a link to an e-mail application, a link to an instant message application, and/or a link to another object. Each row and/or column may contain any mixture of any sort of different types of objects.

FIGS. 1B and 2 show examples of the functioning of the Spin Swipe Module 105. As shown in FIGS. 1B and 2, both an x-axis and y-axis overlap or cross one another at the center of the image. The user can, via Spin Swipe Module 105, swipe their finger along either of the x- and/or y-axes in the forward and/or backward directions to initiate what appears as a spin in any of the four directions, left, right, up, or down (e.g., spinning the carousel to the next image, where the left and right directions are along the x direction (FIG. 1B) and the up and down are along the y-axis (FIG. 2). For example, by swiping in the y direction (or vertical direction), a different color photo filter may be selected for viewing the images, which swiping in the x direction (or horizontal direction) may change the degree to which the filter is applied. Alternatively by swiping in the x direction (or horizontal direction), a different color photo filter may be selected for viewing the images, which swiping in the y direction (or vertical direction) may change the degree to which the filter is applied.

In FIGS. 1B and 2, the user selects a carousel, via Spin Swipe Module 105 (e.g., the up/down carousel or the right/left carousel). The selected carousel may appear in the forefront, being the active spinning carousel, with the other unselected carousel remaining static, and in the background. Alternatively, a carousel does not need to be the forefront carousel to be active (or selected). In other words, a user may be able to choose, via Spin Swipe Module 120, one carousel or another by swiping in either the vertical or horizontal directions. In an alternative embodiment, the alternate axis that is not being spun does not necessarily remain static. The alternate axis may spin along with or intermittently as the other axis that is being spun spins intermittently. In an embodiment of Spin Swipe Module 105, if a user spins the x-axis, bordering images associated with the y-axis can be seen to also spin as each new image comes into view. Two axes may be both spinnable at any given time whether or not the chosen axis is in the foreground, but the active axis may be in the forefront, and the direction of the swipe may determine the direction of the spin and/or which carousel spins. When using an embodiment of Spin Swipe Module 105, the carousel in the foreground has panels on the side of the image in the center may have foreshortened preview images, whereas the side panels may not be visible (or may be faded or more distant) for the carousel that is in the background. The x and y carousels may overlap and may be active simultaneously. When multiple carousels overlap and/or are active simultaneously, both, one, or none of the carousels may appear in the foreground depending on the embodiment.

FIG. 1B shows a diagram of an example of a mobile device 150 (which may implement Spin Swipe Module 105), which is part of the system for viewing images, which the user has selected to spin a carousel along the x-axis. Mobile device 150 includes the menu 151, the x-axis 152, application page 155, center panel 160, top panel 165, bottom panel 170, left side panel 175, right side panel 180, and user 190. In other embodiments mobile device 150 may not have all of the elements or features listed and/or may have other elements or features instead of or in addition to those listed.

Menu 151 may be a menu for the system for viewing an image and may be included on a menu bar that is provided on the mobile device. The menu bar may also include options such as a camera (see the camera icon on the right side of the menu). Optionally menu 151 may list functions for viewing and implementing system 100. Optionally menu 151 may include options for selecting and/or activating any of the modules and/or functions of the modules of FIG. 1.

Menu 151 may appear above, below, on the side, or in any location on any window unless overlapped (or hidden) by another command function. The menu may contain things like "Search," "Feed," "Home," and "Activity." Selecting "Search" may initiate a search, selecting "Feed" may initiate the viewing and/or establishing of an RSS feed another feed. Selecting "Home" may return the user to a home page. Selecting "Activity" may cause a list of different activities to appear that the user may select from.

In FIG. 1B, mobile device 150 may include an application that is downloaded onto mobile device 150 for use by the user. The application may be activated by clicking on the menu icon (see menu 151) or another icon that is provided in the menu bar of the user device. In FIG. 1B, the application has been opened and the user has located a desired set of images. The user's images can be presented on two carousels. One carousel that spins in along the x-axis 152 (right/left) and includes the center image in panel 160 as well as the left panel 175 and the right panel 180. Another carousel may spin along the y-axis (including center panel 160, top panel 165, and bottom panel 170).

The x-axis 152 is shown by the two arrows in the horizontal direction starting from the center of the center image 160). The carousel of x-axis 152 allows for movement of panels in the right/left directions. X-axis 152 indicates the possible directions of rotation for one of the carousels (the horizontal carousel). The panels may display images, links, hashtags, or other object. In some embodiments, the arrow showing x-axis 152 appears when a user selects the right/left (horizontal) carousel. The appearance of the arrow may be in the foreground or the background (e.g., it may; be faded or transparent, but still seeable). In other embodiments, the arrow does not appear, but, via Spin Swipe Module 120, the user selects the carousel and swipes left and/or right./

Application page 155 is a page from the graphical user interface (GUI) of the application running on mobile device 150 that provides for viewing images and implementing Spin Swipe Module 120.

Center panel 160 displays the image currently selected, which is usually an image chosen by the user or an image from the group of images chosen by the user. Center panel 160 may show the first image in a series (e.g., a series of images from a specific date). In other embodiments, the center panel 160 may show an image that was brought up by a search engine after the user includes parameters for a search.

In an embodiment, the side panels may be located along the direction of travel, that is, along the direction in which the carousel Spin Swipe Module 120 spins. So, Spin Swipe Module 120 may create a carousel that spins vertically and may have side panels above and below the center panel 160. Top panel 165 may be part of the vertical carousel that includes top panel 165, center panel 160 and bottom panel 170, and may not be fully visible as a result of being faded and/or foreshortened. As mentioned above, top panel 165 (or any of the panels) may contain an image, a photograph, a hashtag, a link to social media, etc.

Bottom panel 170 may be part of a vertical carousel containing the top panel 165, the center panel 160, and the bottom panel 170. Top panel 165 and bottom panel 170 may stay stationary as the carousel spins along x-axis 152. Top panel 165 and/or bottom panel 170 may spin horizontally when the x axis spins horizontally. Top panel 165 and/or bottom 170 may also move to the left or right out of frame to be replaced by new frames that are currently hidden on the x axis Left side panel 175 is part of the horizontal carousel that includes left side panel 175, center panel 160, and right side panel 180.

Right side panel 180 is also part of the same horizontal carousel that includes left side panel 175, center panel 160, and right side panel 180.

Left side panel 175 and/or right side panel 180 may spin vertically when the y axis spins horizontally. Left side panel 175 and/or right side panel 180 may also move up or down out of the frame to be replaced by new frames that are currently hidden on the y axis.

The depiction of user 190, in FIG. 1B, in combination with the arrows, indicates the direction of a swipe along either arrow to the right or left along x-axis 152 moves the horizontal carousel in either direction. In some embodiments, a swipe that only moves content one panel to the right would result in the content initially in left side panel 175 moving into the center panel 160, the content initially in the center panel moving into right panel 180, the content initially in right panel 180 disappearing, and new content appearing in left panel 175. A swipe that only moves content two panels to the right would result in the content initially in left side panel 175 moving into the center panel 180, and the content initially in the center panel moving into right panels 160 and 180 disappears (and may be replaced by new content).

Similarly, a swipe that only moves content one panel to the left would result in the content initially in right side panel 180 moving into the center panel 160, the content initially in the center panel moving into left panel 175, the content initially in left panel 174 disappearing, and new content appearing in right panel 180. In some embodiments, the user may choose to swipe through more than one image by swiping continuously to the right until the user finds the desired image. For example, the number or the content of panels 160 that shift to the right or to the left may depend on (e.g., may be proportional to) the speed and/or the length of the swipe.

A swipe that only moves the content of two panels to the right would result in the content initially in left side panel 175 moving into the right panel 180, and the content initially in the center panel 160 and right panel 180 disappearing (and maybe being replaced by new content). A swipe that only moves content two panels to the right would result in the content initially in right side panel 180 moving into the left panel 175, and the content initially in the center panel 160 and right panel 175 disappearing (and being replaced by new content). When a user swipes left or right with a swipe that moves content more than two panels, the content of panels 160-180 moves off the screen downward or upward, respectively, and the direction of the swipe determines which direction to swipe to find the content that was moved out of view. Any place in this specification where the word, "content" is referenced, the content may be an image, file, folder, text, a document, a link, a hashtag, and/or a directory.

FIG. 2 shows a diagram of an example of a mobile device 250 in which a vertical swipe is being implemented. Mobile device 250 includes the y-axis 253, application page 255, center image 260, Menu 263, Camera 264, top panel 265, bottom panel 270, left side panel 275, right side panel 280, and user 290. In other embodiments system 200 may not have all of the elements or features listed and/or may have other elements or features instead of or in addition to those listed.

Y-axis 253 is shown by the two arrows in the vertical direction starting from the center of the center image 260. Y-axis 253 allows for movement of panels in the up/down directions. The y-axis 253 indicates the direction of spin for one of the carousels (the vertical carousel). In other embodiments, the arrow does not appear, but the user selects the up/down carousel by swiping the carousel along y-axis 253. In embodiments in which the arrows appear, the arrows may be in the foreground or the background (e.g., the arrows may; be faded or partially transparent, but still seeable).

Application page 255 is the portion of the mobile device page that provides the graphical user interface (GUI) for the system for viewing images.

Center panel 260 may be an image chosen by the user or an image from the group of images chosen by the user. Center panel 260 may show the first image in a series (e.g., a series of images from a specific date). In other embodiments, center panel 260 may contain any image from the series of images chosen by the user. In other embodiments, center panel 260 may show content that was brought up by a search engine after the user includes parameters for a search.

Menu 263 can be represented by an icon and may be included in the menu bar of the user device. Menu 263 may be implemented by Menu module 150 in FIG. 1. Menu 263 is discussed in more detail in FIG. 1 Menu Module 150.

Camera 264 can be represented by an icon and may be included in the menu bar of the user device. Camera 264 may be implemented by Camera Module 155 in FIG. 1. Camera 264 is discussed in more detail in FIG. 1 Camera Module 155.

Top panel 265 and bottom panel 270 are part of the vertical carousel that includes the top panel 265, the center panel 260 and the bottom panel 270, which participate in the spinning of the carousel during a spin swipe. When a user swipes upward, with a swipe that only shifts content by one panel, the initial content of panel 265 moves upward off the viewing screen, the initial content of center panel 260 may move into top panel 265, and the initial content of bottom panel 270 may move to center panel 260. When a user swipes upward, with a swipe that only shifts content by two panels, the initial content of panel 265 moves upward off the viewing screen, the initial content of center panel 260 may move upward off the screen, and the initial content of bottom panel 270 may move to top panel 265.

When a user swipes downward, with a swipe that only shifts content by one panel, the initial content of panel 270 moves downward off the viewing screen, the initial content of center panel 260 may move into panel 270, and the initial content of panel 265 may move to panel 260. When a user swipes downward, with a swipe that only shifts content by two panels, the initial content of panel 270 moves downward off the viewing screen, the initial content of center panel 260 may move downward off the screen, and the initial content of panel 265 may move to panel 270.

When a user swipes downward or upward with a swipe that moves content more than two panels, the content of panels 260-265 moves off the screen downward or upward, respectively, and the direction of the swipe determines which direction to swipe to find the content that was moved out of view.

Left side panel 275 and right side panel 280 are part of the horizontal carousel, that do not participate in the vertical spin swipe. The horizontal carousel includes left side panel 275, center panel 260, and right side panel 280.

User 290 in combination with the arrows in FIG. 2, indicates that a swipe along either arrow up or down along y-axis 253 moves the horizontal carousel in either direction. In some embodiments, a swipe upward would result in the content initially in bottom panel 270 moving into the center panel 260 and new content entering the bottom panel 270. In some embodiments, the user may choose to swipe through more than one image by swiping continuously up until the user finds the desired image. The appearance of the arrow may be in the foreground or the background (e.g., it may; be faded or transparent, but still seeable or not present).

In an embodiment, each row (or column) may be a different folder and each frame within the row (or column) may be a different file, and thus a Spin Swipe along the x-axis (or y-axis) changes which folder is being viewed and a spin swipe along the y-axis (or x-axis) changes which file within the same folder is displaced. Alternatively or additionally, a specific file in a folder may be selected from the y Spin Swipe axis, and then a Swipe Frame may be activated to send the file to a new folder (which may be displayed on the border frames. Alternatively or additionally, command function may be accessed, by swiping the file towards a side panel associated with that function, such as copy, delete, email, instant message, group chat, or photo filter to copy, delete, email, instant message, group chat, or filter the content in the center panel.

FIG. 3 shows a diagram of an example of mobile device 350 in which content of a panel is being selected. Mobile device 350 includes application page 355, the center panel 360, top panel 365, bottom panel 370, left side panel 375, right side panel 380, content selection icon 385 and the user 390. In other embodiments, mobile device 350 may not have all of the elements or features listed and/or may have other elements or features instead of or in addition to those listed.

Application page 355, center panel 360, top panel 365, bottom panel 370, left side panel 375, the right side panel 380, and the user 390 may be an embodiment of application page 155, center panel 160, top panel 165, bottom panel 170, left side panel 175, right side panel 180, and user 190, which were discussed in FIG. 1.

Content selection icon 385 may appear in response to a user selecting content, such as by tapping on panel 360 (e.g., with a predetermined number of taps, such as one tap, two taps, or three taps). The icon may be a temporary indication that the user selected content of a panel. In some embodiments, the content selection icon 385 is not shown. As illustrated in FIG. 3, a photo can be double tapped (or, in other embodiments, selected in other ways) to bring the photo forward as a standalone item independent of both carousels (which optionally may enlarge the image to fill the screen). Selecting panel 360 may open the content in panel 360. For example, if the content of panel 360 is a file, folder, link, social directory, folder, or directory, for example, the file, folder, link, social directory, folder, or directory may be opened. In an embodiment, one number of taps may select the content of the panel and a different number of taps may select a carousel or a different carousel than is currently selected. In an embodiment, which carousel is selected may depend on the number of taps.

FIG. 4 shows a diagram of an embodiment of in which a horizontal swipe is used to send content to a location and/or to categorize content. Mobile device 400 may include groups panel 420, social networks panel 430, application page 455, arrows 456 center panel 460, top pane panel 465, bottom pane panel 470, left side pane panel 475, right side pane panel 480, and user 490. In other embodiments mobile device may not have all of the elements or features listed and/or may have other elements or features instead of or in addition to those listed.

FIG. 4 also shows another mode of operation (which may be the same embodiment or a different embodiment as depicted in FIGS. 1B-3). In FIG. 4, the content in a central frame is surrounded by borders—pane panels, like in a picture frame. Each of the borders is a panel of the picture frame and may consist of an individual fixed content, link, symbol, icon, or word (such as an icon of a social media), indicating where the content initially in the central panel 460 will be sent when the user swipes the content towards frame panel.

Application page 455, center panel 460, top panel 465, bottom panel 470, left side panel 475, the right side panel 480, and the user 490 may be an embodiment of application page 155, center panel 160, top panel 165, bottom panel 170, left side panel 175, right side panel 180, and user 190, which were discussed in FIG. 1.

The groups panel 420 is a panel via which the user may select what one of more of the pane panels may be. Similarly, social networks panel 430 is a panel via which the user may select what one or more of the pane panels may be.

Application page 455 is a page of an application in which the content of a panel may be stored in one location. Arrows 456 indicates the direction and location in which the user swipes their finger during the operation illustrated in FIG. 4, which is a left or right swipe that sends content to a location, such as a social media for storage and/or for being posted. Center panel 460 is a panel in which selected content is visible, which the user would like to send to a location or store at a location. Top pane panel 465 is a location to which the user may store the content of center panel 460 by swiping the content towards top pane panel 465 (however, FIG. 4 illustrates the use of a left or right swipe, and top panel 465 would not participate in a left or which swipe). Bottom pane panel 470 is a location to which the user may store the content of center panel 460 by swiping the content towards bottom pane panel 470 (however, top panel 465 would not participate in the left or right swipe of FIG. 4). Left pane panel 475 is a location to which the user may store the content of center panel 460 by swiping the content towards left pane panel 475, which may be involved in a left swipe. Right pane panel 480 is a location to which the user may store the content of center panel 460 by swiping the content towards left pane panel 480, which may be involved in a right swipe. The locations indicated by top panel 465, bottom panel 470, left side panel 475, the right side panel 480 may be social networks, files, folders, message boards, or blogs, for example. One of top panel 465, bottom panel 470, left side panel 475, the right side panel 480 may be labeled "e-mail," the name of an e-mail application, or another indication of an association with e-mail, and swiping towards the panel with the e-mail indication may open an e-mail application, initiate the sending of an e-mail, and/or automatically send content as an e-mail to a predetermined destination. The side panel associated with e-mail, may have a specific e-mail address to which e-mails are sent, and there may be different panels for different e-mail addresses. Alternatively, after swiping to e-mail the user may be queried for the e-mail address to send the e-mail. The panel associated with the e-mail may activate an e-mail command that sends or initiates the sending of an e-mail. One of top panel 465, bottom panel 470, left side panel 475, the right side panel 480 may be labeled "e-mail," the name of an instant message application, or another indication of an association with sending an instant message, and swiping towards the panel with the e-mail indication may open an instant message application, initiate the sending of an instant message, and/or automatically send content as an instant message to a predetermined destination. Alternatively or additionally, one or more of top panel 465, bottom panel 470, left side panel 475, the right side panel 480 may be labeled with the name of a command, and swiping towards that panel may initiate and/or implement the command. For example, one or more of top panel 465, bottom panel 470, left side panel 475, the right side panel 480 may implement or initiate a delete, copy, or paste command, thereby deleting or copying the content in the center panel 460 or pasting new content to center panel 460.

In the embodiment of FIG. 4 content is sent, and/or stored via a horizontal swipe, at a location indicated by the left and right pane panels (which are pane panel 475 and pane panel 480, respectively), where the information displayed on pane panel 480 and panel 475 is not an image, but an indication of (or content that indicates) where the contents of the center initially panel 460 will be sent in response to a swipe towards that panel.

For some example of how to use application page 455, by selecting groups panel 420 selections of different types of groups of a location for labeling pane panels 465-480 may be presented to the user that the user may select. In an embodiment, by selecting one of groups panel 420 causes a particular group of pane panels to be located at pane panels 465-480. Each of pane panels 465-480 may be different embodiments of top panel 465, bottom panel 470, left side panel 475, the right side panel 480 (described above), which may be associated with a social network, file location, folder location, an e-mail application, and/or an instant message application (which was described above). For example, when groups panel 420 is selected there may be two groups of groups that the user may select from. The first group I may include Group 1, Group 2, Group 3, and Group 4, and if selected links to Group 1, Group 2, Group 3, and Group 4 may be appear in pane panels 465, 470, 475, and 480, The second group II may include Group 5, Group 6, Group 7, and Group 8, and if selected the second group II is selected links to Group 5, Group 6, Group 7, and Group 8 may be appear in pane panels 465, 470, 475, and 480.

Social networks panel 430 may cause links to social networks to appear in pane panels. Alternatively, the social networks panel 430 may present to the user groups of social networks that user may select from. For example, when social networks panel 430 is selected there may be two social networks that the user may select from. The first group may include Social Network 1, Social Network 2, Social Network 3, and Social Network 4, and if selected links to Social Network 1, Social Network 2, Social Network 3, and Social Network 4 may be appear in panels 465, 470, 475, and 480, The second group may include Social Network 5, Social Network 6, Social Network 7, and Social Network 8, and if selected the second group is selected links to Social Network 5, Social Network 6, Social Network 7, and Social Network 8 may be appear in panels 465, 470, 475, and 480

As another example, groups panel 420 may be used to select one or more groups or pairs of groups, which may be placed on the top and bottom panel, whereas social networks panel 430 may be used for selecting between different pairs of networks that are placed in the left and right panels.

Alternatively, after swiping the content of the center panel 460 to one of the side pane panels 465-480, the user may be sent to a page where the user may choose one or more social network (or other locations). In some embodiments, when the user sets up the system, the user may choose which social network, storage locations, and/or networks to include. In some embodiments, there is a single default social network (or multiple default social networks). In some embodiments, the user may change the default.

As an example, left side pane panel 475 may allow a user to swipe left to send the chosen content (the image in the center panel 460) to a social network site such as twitter (note the twitter icon) that is associated with left side pane panel 475. In other embodiments, pane panels 475, 480, 465, and 470 may e-mail addressed, and swiping the content towards one the panels causes the content to be sent as an e-mail to the e-mail address associated with that panel. In an embodiment, pane panels 475, 480, 465, and 470 may be labeled with blogs and/or websites where content may be posted and swiping the content towards one of the pane panels 475, 480, 465, and 470 causes the content to be posted on the blog or website associated with the panel towards which the content was swiped left side panel 475 may be a folder for storing content. In other embodiments, left side pane panel 475 (or any of the pane panels 475, 480, 465, and 470) is an image. In other embodiments, each of the pane panels (475, 480, 465, and 470) may consist of an individual fixed image, link, symbol, icon, or word indicating the choice.

Each of the four pane panels (walls or borders), including the top panel 465, the bottom panel 470, the left side panel 475 and the right side panel 480 may represent a category where the content may be stored and/or a destination where the photo may be sent and/or posted (e.g., each panel may be a different social network). Using the panel, allows a user to quickly swipe the photo, pushing and/or swiping the photo towards a single destination and/or towards multiple destinations without having to access additional buttons or lists of choices. The functions that may be activated by selecting or swiping towards the panel are not limited to the above functions alone. The same options for selecting files and folders during the swipe frame may also be available while performing the spin swipe.

FIG. 5A shows a diagram of an embodiment of mobile system 500. The mobile system 500 includes, the groups panel 520, the social networks panel 530, y-axis 553, application page 555, the center panel 560, the top panel 565, the bottom panel 570, the left side panel 575, the right side panel 580, and the user 590. In other embodiments mobile system 500 may not have all of the elements or features listed and/or may have other elements or features instead of or in addition to those listed.

FIG. 5A illustrates embodiment in which content in center panel 560 is sent, and/or stored via a horizontal swipe, at a location indicated by the right and left panels (which are pane panel 575 and panel 580, respectively), where the content displayed on pane panel 575 and panel 580 is not a photo, but an indication of where the contents of the center panel 560 will be sent in response to a swipe towards that panel.

The groups panel 520 and the social networks panel 530 are embodiments of groups panel 420 and social networks panel 430, which were discussed in FIG. 4.

The top pane panel 565 allows a user to swipe left to send the chosen image (the image in the center panel 560) to a social network site such as Instagram (note the Instagram icon).

The bottom pane panel 570 allows a user to swipe downwards to send the chosen image (the image in the center panel 560) to a social network site such as Whats App (note the Whats App icon).

As in FIG. 4, each of the four panels (walls or borders), including the top panel 565, the bottom panel 570, the left side panel 575 and the right side panel 580 may represent a category where the photo may be stored and/or a destination where the photo may be sent and/or posted (e.g., each panel may be a different social network). Using the panel, the photo allows a user to quickly swipe the photo, pushing-swiping the photo towards a single destination and/or towards multiple destinations without having to access additional buttons or lists of choices. The functions that may be activated by selecting or swiping towards the panel are not limited to the above functions alone. The same options for selecting files and folders during the swipe frame may also be available while performing the spin swipe.

Application page 555, top panel 565, bottom panel 570, left side panel 575, right side panel 580, and user 590 may be embodiments of Application page 455, top panel 465, bottom panel 470, left side panel 475, right side panel 480, and user 490, which were described in conjunction with FIG. 4.

User 590 is depicted as a hand, which together with arrows 556 of FIG. 4 indicate the motion the user makes when implementing an up or a down swipe for storing content at, and/or sending content to, a particular location.

While in some embodiments, the choices of where the user may send/post the photo may be limited to four, the spin swipe method allows for numerous choices—where each choice may be in a different location on the border/pane of the content panel 560, for example.

FIGS. 4 and 5A show another mode of an embodiment of system 100, which optionally may be used in conjunction with swipe frame module 120. In an embodiment, content (e.g., a photo) may be viewed and/or categorized on mobile device 400 or 500 using one of the panels of the frames of the image. For example, the user may choose content, such as by pressing on the content or otherwise selecting the content. The chosen content may be bordered with panels, which in an embodiment, form a structure that may appears as windows panes surrounding the central panel. The windowpane panels may be located on the left and right, as well as, above and below the content panel. The windowpane panels surround the content and may appear similar to a picture frame (for example). In other embodiments, the panels may have other visual appearances. In some embodiments, the swipe (e.g., of FIG. 4 and/or of FIG. 5A) automatically posts the content to the social network or activates other commands.

Figure 5B:
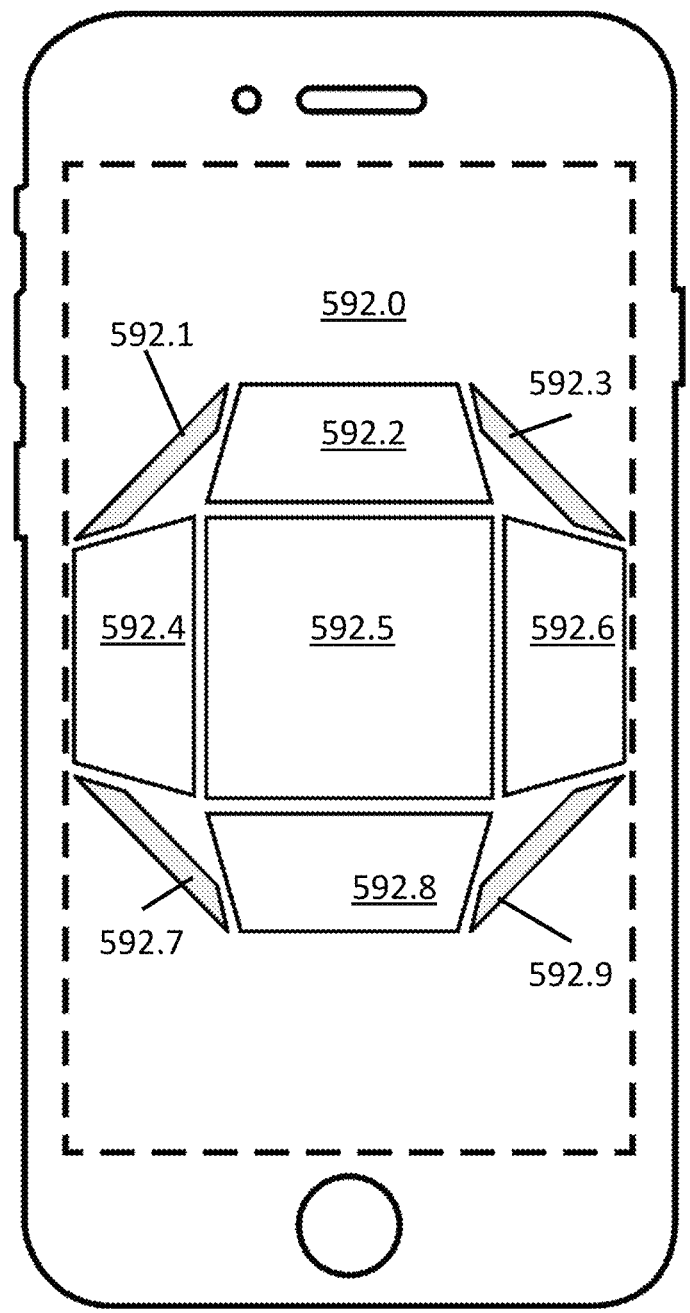
FIG. 5B shows a diagram of an example of a screenshot of another embodiment of a mobile system in which swiping is used for categorizing and/or send subject matter to a destination.

FIG. 5B shows a diagram of an example of a screenshot 592.0 of another embodiment of a mobile system 592.0. Screenshot 592.0 may include border panel 592.1, top content panel 592.2, border panel 592.3, left content panel 592.4, center content panel 592.5, right content panel 592.6, border panel 592.7, bottom content panel 592.8, and border panel 592.9.

Border panels 592.1, 592.3, 592.7, and 592.9 function similar to border panels pane panels 475, 480, 465, and 470 (FIG. 4). Each of border panels 592.1, 592.3, 592.7, and 592.9 may be labeled with a different social media site, other site, storage location, and/or other destination. Center content panel 592.5 plays the same role as center panel 460. The user swipes the center content panel 592.5 in the direction of one of border panels 592.1, 592.3, 592.7, and 592.9, and the content of center content panel 592.5 is sent to the destination associated with the corresponding one of border panels 592.1, 592.3, 592.7, and 592.9 (thereby causing the content to be posted on a social media site, other site, stored in a storage area, and/or sent to a destination). Additionally or alternatively, border panel 592.1, top content panel 592.2, border panel 592.3, left content panel 592.4, center content panel 592.5, right content panel 592.6, border panel 592.7, bottom content panel 592.8, and border panel 592.9 may be swiped towards one of border panels 592.1, 592.3, 592.7, and/or 592.9, to cause the content of the content panels swiped to be sent to the site, storage area, and/or destination associated with the one of border panels 592.1, 592.3, 592.7, and/or 592.9 towards which the user swiped.

FIG. 6 shows a diagram of an embodiment of a mobile system 600. Mobile system 600 includes groups panel 620, social networks panel 630, application page 655, center image 660, top panel 665, bottom panel 670, left side panel 675, arrows 676, right side panel 680, and user 690. In other embodiments mobile system 600 may not have all of the elements or features listed and/or may have other elements or features instead of or in addition to those listed.

FIG. 6 shows a vertical border swipe. Left pane panel 675 is the panel that is swiped in FIG. 6. Arrows 676 show the direction and location of the motion for the vertical border wipe. Optionally, left pane panel 675 and/or right pane panel 680 may be part a carousel of border frames. In some embodiments, using the vertical border the user may choose a variety of social networks to appear in left pane panel 675 or right pane panel 680 instead of the social network currently present. For example, after one slides or swipes left panel 675, the current social network is removed from left pane panel 675 and replaced with another social network (or location to save or send the content of the center panel 660). The chosen network is placed into the left pane panel 675 position and the center image 660 can be swiped or moved into the left pane panel 675 sending it to the social network. In some embodiments, the user is automatically sent to the social network to add information about the photo. In some embodiments, the system queries the user whether the user really wanted to post the photo to the chosen social network. In an embodiment, a vertical border swipe may be performed with right pane panel 680 instead.

FIG. 7 shows a diagram of an embodiment of mobile device 700. Mobile device 700 includes groups panel 720, social networks panel 730, application page 755, center image 760, top panel 765, border x-axis 766, bottom panel 770, left side panel 775, right side panel 780, and user 790. In other embodiments system 700 may not have all of the elements or features listed and/or may have other elements or features instead of or in addition to those listed.

FIG. 7 shows a horizontal border swipe. Top pane panel 765 is a panel that may be swiped to change the social network or other location to which content is posted and/or saved as a result of a swipe frame. Arrows 766 indicates a direction of a swipe for a horizontal along the top panel 765 of the border framing the center panel 760. In some embodiments, the user may choose a variety of networks and/or other locations to store the content initially in content panel 760. By swiping or sliding top panel 765, to the right or left, the social network initially indicated in top panel 765 disappears and is replaced with another social network (or other place to send or store the content in center panel 760). The chosen function is placed into the top panel 765 position, and as a result the content in the center panel 760 can be swiped or moved up to the top panel 765 sending it to the application or function page. In some embodiments, the user is automatically sent to an application page where the use is offered a choice of functions and/or locations to save or post content. In some embodiments, the system queries the user whether the user really wanted to change the social network, location, or function associated with top panel 765. In some embodiments, the same operation may be performed on another t bottom pane panel 770 in addition to or instead of on top pane panel 765.

In some embodiments, a combined function called a swipe frame with carousel walls may be part of the system for viewing a photo, in which top pane panel 765 and/or bottom pane 770 are parts of carousels of different panes, and swiping the pane panel changes the pane panel to another pane panel. The swipe frame with carousel walls may be implemented by the swipe frame module. In the swipe frame described in FIGS. 5-7, may have panes that are each part of separate carousels that each spin through multiple choices thus partially combining the two concepts—swipe frame and carousel walls.

In some embodiments, the combined function call, a swipe frame with border swipe may be part of a system for viewing content. The swipe frame with border swipe may be implemented by the spin swipe module 120. The swipe frame with border swipe may include a swipe frame whose walls (or border panels) may respond to one or two border swipes as described above. Any combination of border swipes, individual carousels, or fixed buttons may be included in the system.

FIGS. 6 and 7 show embodiments of swipe frames with individual carousel walls that allow for border swipes. The border swipe (which may be implemented by another embodiment of or another option within the spin swipe module or as a separate module) allows for movement of the border panels separate from the center image. The embodiment of FIGS. 6 and 7 is similar to a swipe frame except instead of the content (of content panel 660 or 760) changing in response to a swipe, the selection that is indicated on the border panels, changes. There is not necessarily any spin swipe element in FIGS. 6 and 7. In an embodiment of FIGS. 6 and 7, the user places their finger on a border (e.g., the right border) and slides the finger parallel to the direction of that border, and in response the selections that are illustrated in the borders change. For example, a different social network (instead of the social network previously presented), where one may want to post the image may be offered. In an alternative embodiment, the direction of the swipe for the changing a pane panel is perpendicular to arrow 676 and 766.

In an embodiment, one changes just one border at a time. In another embodiment, one changes all borders simultaneously with one swipe. Alternatively, one may be able to choose how many and/or which of the borders one changes simultaneously. In another embodiment, one may be able to change the choices offered on the border panels, while also changing the image that is displayed in the center frame. In an embodiment, the user may have a choice of choosing any of the above modes of how the device responds to a panel being swiped.

Figure 9:
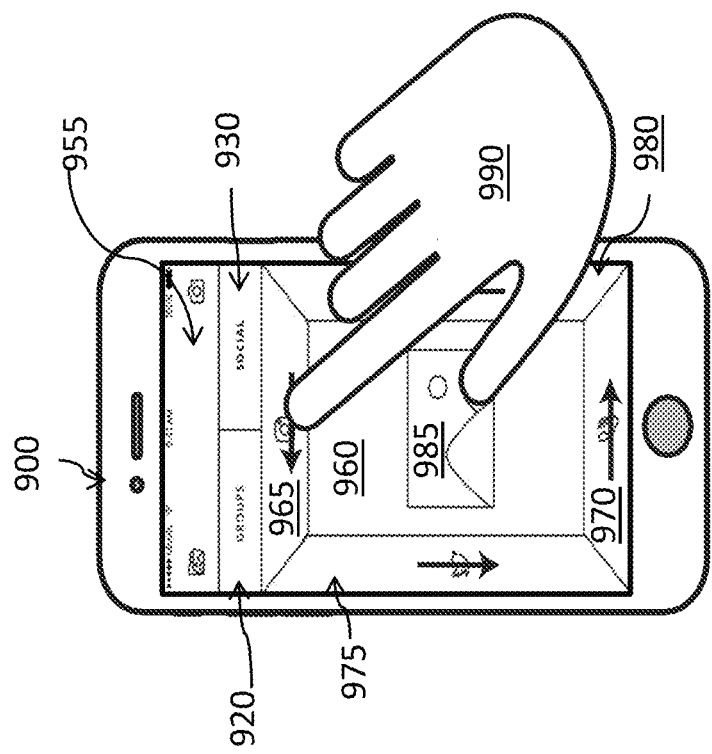
FIG. 9 shows a diagram of an embodiment of a right handed border rotation, swiping horizontally.
Figure 8:
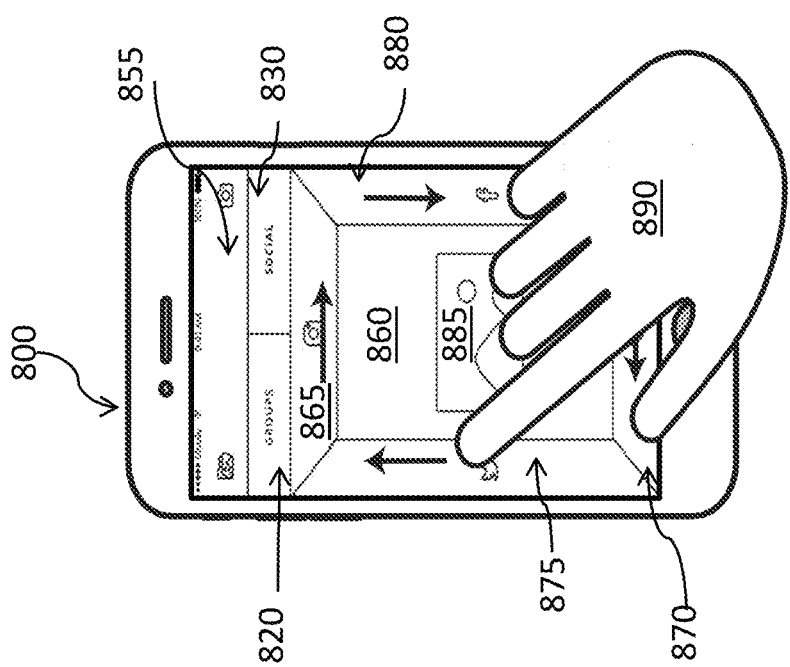
FIG. 8 shows a diagram of an embodiment of a right handed border rotation, swiping vertically.

FIGS. 8 and 9 show an example of the system including a swipe-frame-with-border-spin (which may be implemented by the swipe frame module and/or the spin swipe module). Referring to FIGS. 8 and 9, the swipe-frame-with-border spin may contain a method of spin in which a user can swipe a wall (or border panels) of the frame up, down, left, or right to access a rotation function that causes all four walls of the frame to turn simultaneously spinning the center of the border image around an axis that is centered between the four walls. The border images may be foreshortened to give a visual impression that the image in the center raised up with respect to the images on the border. To cause the rotation of the border image the user swipes or drags their finger along a border panel (or wall) in the direction of the length of the border panel (or wall). The swipe-frame-with-spin can be thought of as a spinning square or rectangular wheel (or wheel having another geometric shape) with the button choices changing on each wall synchronized to each ninety degree spin.

Having the image rotate, by swiping a border panel along the length of the border panel may be applied to swipe frames comprised of geometric figures such as pentagons, hexagons, heptagons, and octagons. In an embodiment, the user may switch between different modes—each mode having a different number of borders and/or different geometric shape.

FIG. 8 shows a diagram of an embodiment of a mobile system 800. Mobile system 800 includes the groups panel 820, the social networks panel 830, application page 855, center panel 860, the top pane panel 865, the bottom pane panel 870, the left pane panel 875, the right pane panel 880, and the user 890. In other embodiments, mobile system 800 may not have all of the elements or features listed and/or may have other elements or features instead of or in addition to those listed.

In FIG. 8, the user 890 is performing a right-handed border rotation in which the pane panels switch locations as indicated by following the arrows shown in each panel. In FIG. 8, user 890 pushes or swipes any of top pane panel 865, bottom pane panel 870, left pane panel 875, right pane panel 880 in the direction of the arrows. In an embodiment, top pane panel 865 is used for a horizontal border swipe and right pane panel 875 is used for a vertical border swipe, whereas bottom pane panel 870 and left pane panel 880 initiate a rotation of the pane panels. Alternatively, the menu (via menu module 151) may be used to select which mode is active. In some embodiments, the arrows may be viewed on the screen by activating a border rotation button or may show up when a user starts the process of the right-handed border rotation. In some embodiments, the arrows do not show up on the screen, but are only provided to depict the right handed border rotation process. The appearance of the arrow may be in the foreground or the background (e.g., it may; be faded or transparent, but still seeable). A swipe towards top pane panel 865, bottom pane panel 870, left pane panel 875, or right pane panel 880 may cause a command function, associated with top pane panel 865, bottom pane panel 870, left pane panel 875, or right pane panel 880, respectively, to be accessed, such as copy, delete, email, instant message, group chat, or photo filter to copy, delete, email, instant message, group chat, or filter the content in the center panel.

FIG. 9 shows a diagram of an embodiment of a mobile system 900 in which left handed border rotation is being implemented. Mobile system 900 includes groups panel 920, social networks panel 930, application page 955, center panel 960, top pane panel 965, bottom pane panel 970, left pane panel 975, right pane panel 980, and user 990. In other embodiments system 900 may not have all of the elements or features listed and/or may have other elements or features instead of or in addition to those listed.

In FIG. 9, user 990 is performing the left-handed border rotation. In FIG. 9, the user 990 first swipes top pane panel 965, left pane panel 975, bottom pane panel 970 and right pane panel 980 in the direction of the arrows to cause a left-handed border rotation. In some embodiments, the arrows may be viewed on the screen by activating a border rotation button or may show up when a user starts the process of the left-handed border rotation. In some embodiments, the arrows do not show up on the screen, but are only provided to depict the lefthanded border rotation process.

While the panels are shown in FIGS. 4-9 as trapezoids, other geometric figures, such as rectangles, pentagons, hexagons, heptagons, and octagons (in which each panel or border of the frame is not necessarily of equal length) can be envisioned allowing for the number of choices to be as many as the edges of the geometric figure. Optionally, the geometric shape may be an oval or a circle in which the border region is divided into multiple sections (e.g., multiple panels). Optionally, the system is user configurable, and the user can decide which category or destination each panel corresponds to.

In FIGS. 4-9 top panel 465, 565, 665, 765, 865, and 965 represent and may be used to send content to Instagram, bottom panel 470, 570, 670, 770, 870, and 970 represent and may be used to send content to Instagram What's App, left side panel 475, 575, 675, 775, 875, and 975 represent and may be used to send content to Twitter, right side panel 480, 580, 680, 780, 880, and 980 represent and may be used to send content to Instagram Facebook. However, in other embodiments, other social networks and/or other locations may be used instead of or in addition to, any of, all of, or any combination of Instagram, What's Up, Twitter, and Facebook Application page 955, top panel 965, bottom panel 970, left side panel 975, right side panel 980, and user 990 may be embodiments of application page 855, top panel 865, bottom panel 870, left side panel 875, right side panel 880, and user 890, which in turn may be embodiments of application page 755, top panel 765, bottom panel 770, left side panel 775, right side panel 780, and user 790, which in turn may be embodiments of application page 655, top panel 665, bottom panel 670, left side panel 675, right side panel 680, and user 690, which in turn may be embodiments of application page 555, top panel 565, bottom panel 570, left side panel 575, right side panel 580, and user 590, which in turn may be embodiments of application page 455, top panel 465, bottom panel 470, left side panel 475, right side panel 480, and user 490, which were described in conjunction with FIG. 4.

FIGS. 10-12 show a method by which a user may re-orient a photo on a mobile device from landscape to portrait or portrait to landscape called a pole spin or an orientation spin. Either spin may be implemented by the orientation module. Optionally, a button may appear on one of the corners of a photo (or optionally elsewhere) which can be tapped and held in order to allow for a ninety degree spin around a center axis spinning the photo to the desired position. Optionally, no button appears, but the user may still just touch a corner of the image and drag the corner down or sideways. FIG. 10 shows the image before being manipulated. FIG. 11 shows the user tapping and/or touching a coring of the image or selecting the button. FIG. 12A shows the image after being rotated 90 degrees by the user.

FIG. 10 shows a diagram of an embodiment of an example of an image 1000 just before being rotated. The Rotated image 1000 includes the application page 1055 and the center image 1095. In other embodiments system 1000 may not have all of the elements or features listed and/or may have other elements or features instead of or in addition to those listed.

The application page 1055 can be any of the application pages provided herein. However, in FIGS. 10-12A, the center image 1095 has been selected and now fills most of the application page. In some embodiments, a part of the application page 1055 can be tapped to reduce the center image and bring back the other parts of the application page including but not limited to, the carousels, the side panels, the top, and bottom panel, the function and social network panels, etc. FIG. 10 shows image 1000 prior to be being rotated.

The content of center panel 1095 shown in FIG. 10 is a sideways view of a sun and two hills.

FIG. 11 shows a diagram of an embodiment of an example of the user tapping and/or touching a corner of the image, just before rotating the image 1100. The diagram 1100 includes application page 1155, center panel 1195, user 1190, and rotation function 1199. In other embodiments system 1000 may not have all of the elements or features listed and/or may have other elements or features instead of or in addition to those listed.

The rotation function 1199 may be activated to rotate a photo to be rotated any amount (e.g., from 1° to 360°) as desired by the user. In another embodiment the user can only rotate the image in increments of 90 degrees. In an embodiment, to perform the rotation the user needs to tap of the right corner of center panel 1195. In another embodiment, while the user 1190 in FIG. 11 is tapping on the top right corner of the image (based on the top and bottom of the mobile device), tapping on any corner of the image may activate the rotation function 1199. In some embodiments, a button or icon appears on the area tapped that helps the user to decide how much the image should be rotated, by for example, showing the number of degrees of rotation. In some embodiments, the application provides the user with a default rotation that results in the image being centered and rotated (e.g., the mountains at the bottom and the sun in the top right). After the user taps on any corner of the image, the user can rotate the image until the user is happy with the position of the image.

Thus, in FIG. 12A, the image after the user has rotated the center image 1295 until the image is "righted" or correctly positioned.

Figure 12D:
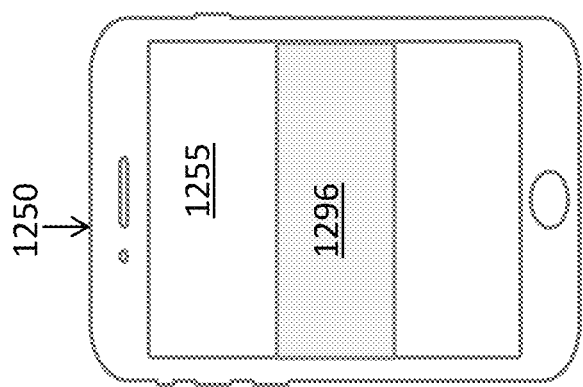
FIGS. 12B-J show examples of screenshots of three different embodiments of a pole spin.
Figure 12C:
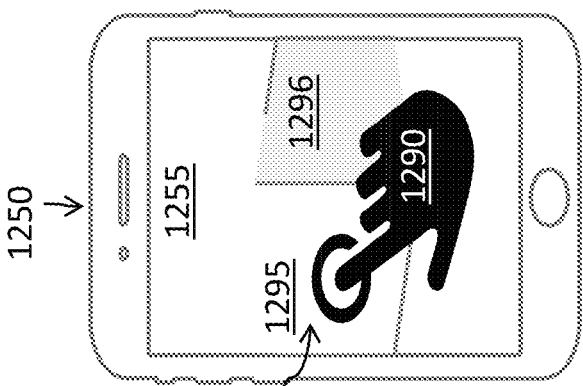
Figure 12B:
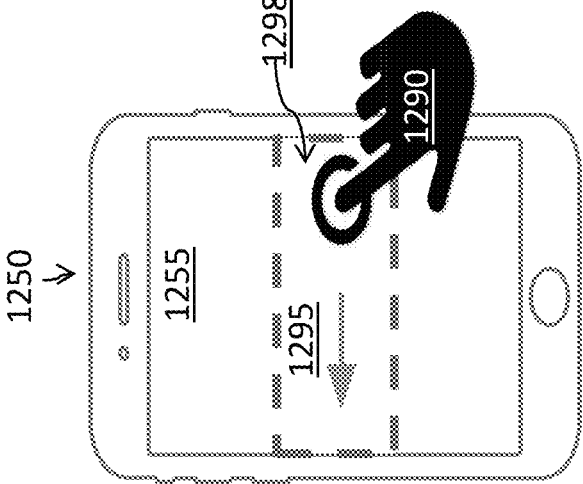
Figure 12G:
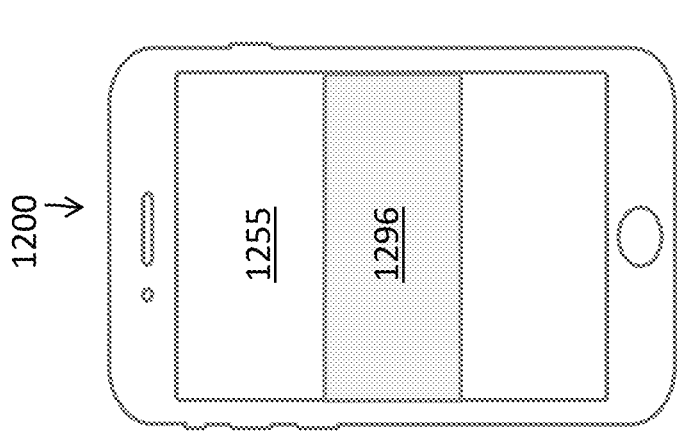
Figure 12F:
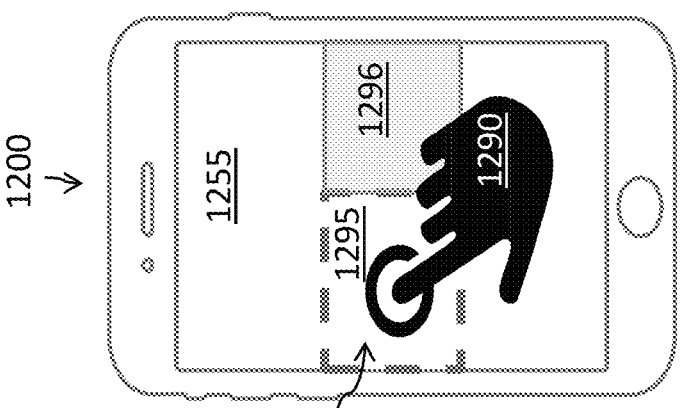
Figure 12E:
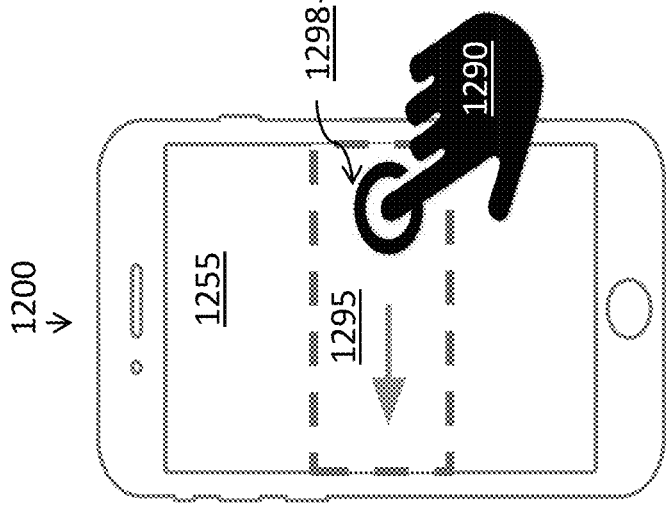
Figure 12J:
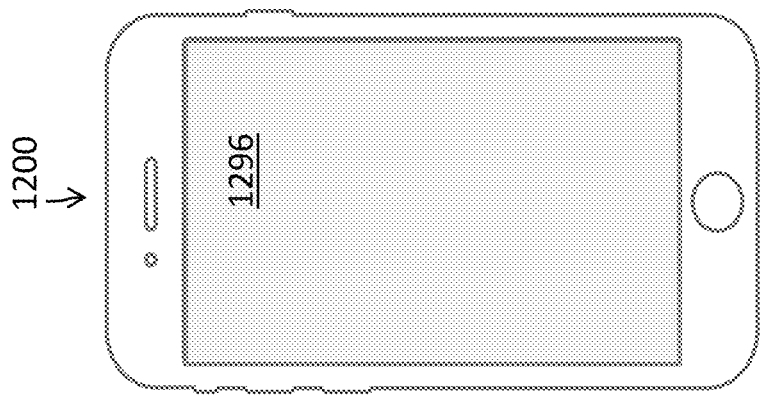
Figure 12I:
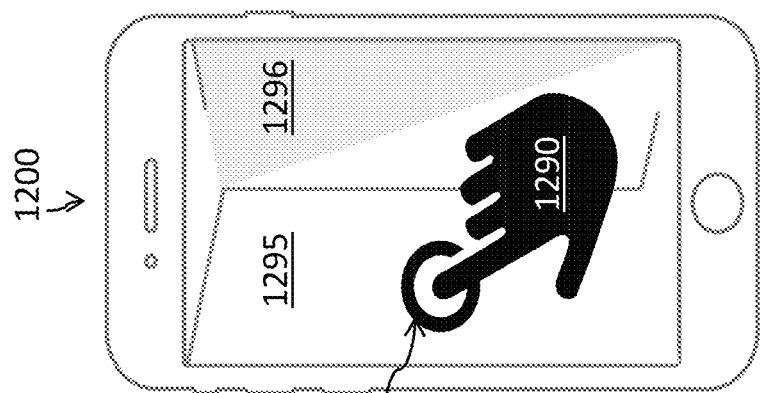
Figure 12H:
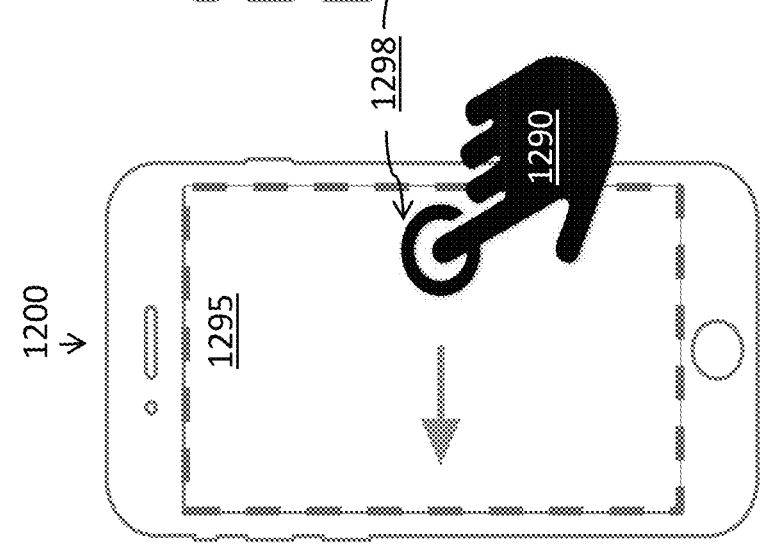
Figure 12N:
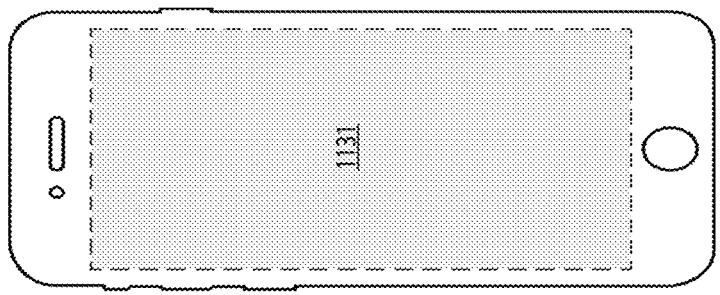
FIGS. 12K-N show an example of a pole spin in which the entire screen is spun.
Figure 12M:
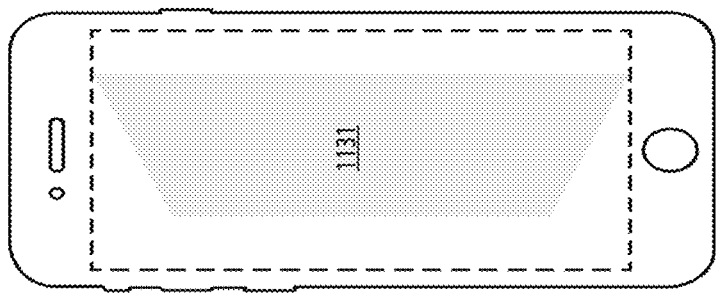
Figure 12L:
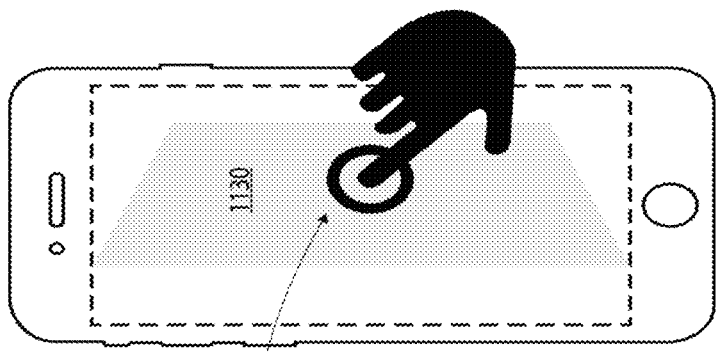
Figure 12K:
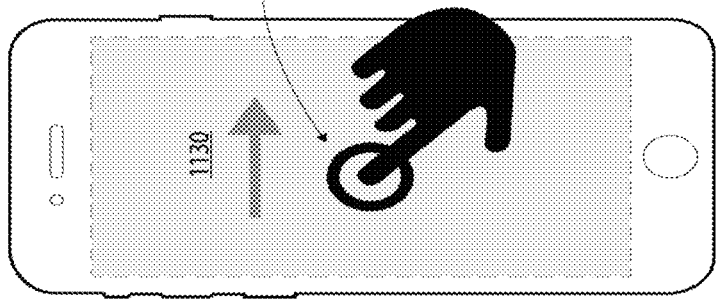
Figure 12V:
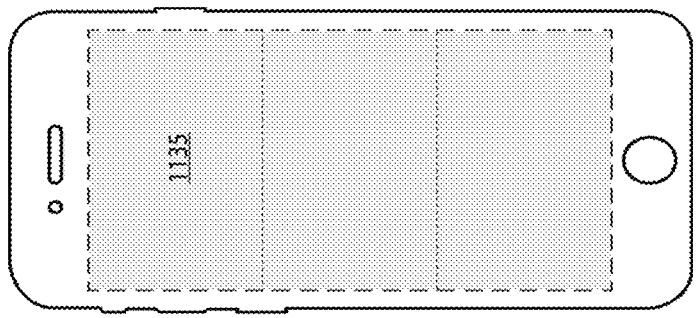
FIGS. 12S-V show an example of a pole spin in which only the top third of the screen is spun.
Figure 12U:
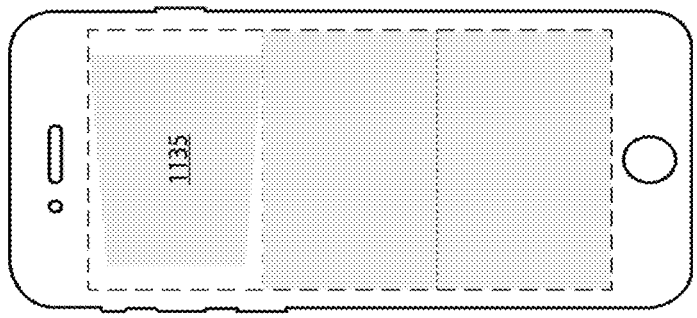
Figure 12T:
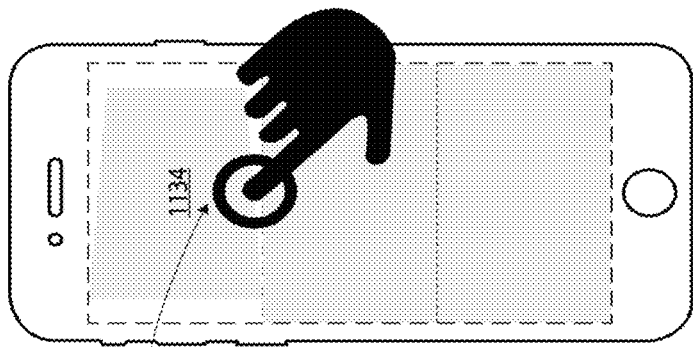
Figure 12S:
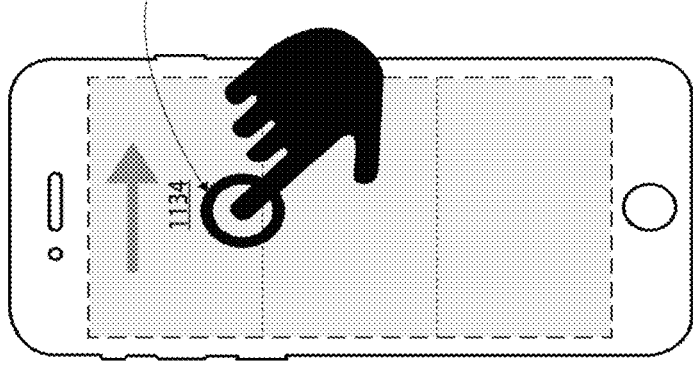

FIGS. 12B-J show examples of screenshots of three different embodiments of a pole spin. The pole spin is a function in which different content may be associated with different sides of a virtual cube, which the user may cause to spin around a fixed vertical or horizontal axis. Alternatively, the pole spin may be used for rotating a 3-D image. FIGS. 12B-G show two embodiments of "Partial pole spin," in which only part of a screen and/or frame is rotated (or spun). FIGS. 12H-J shows a "Pole spin," in which an entire screen or frame is spun. FIGS. 12B-D show a first embodiment of a pole spin or a partial pole spin to the left, FIGS. 12E-G show a second embodiment of the pole spin or a partial pole spin, and FIGS. 12H-J show a third embodiment of the pole spin. FIGS. 12B, 12E and 12H, show a screenshot at the beginning of performing the pole spin. In FIGS. 12B, 12E and 12H, the user is selecting a portion of the panel, in which the user has selected a portion of the image to grab and use as a handle while rotating the virtual cube or 3D image. In FIGS. 12C, 12F, and 12I, show a screenshot while the pole spin is being performed at a point where the virtual block has been rotated 45 degrees, and two panels of the cube are visible. FIGS. 12D, 12G, 12J, show a screenshot at the completion of the partial pole spin, where another face of the block is visible. In FIGS. 12B-D and FIGS. 12E-G, the block that rotates only occupies a portion of the screen, whereas in FIGS. 12H-J the block occupies the entire screen. Also, in FIGS. 12B-D and FIGS. 12H-J, a foreshortened view of the block is presented in which the corner that is visible in the screenshot appears closer to the viewer than the rest of the block, when the corner is in the center of the screen, whereas FIGS. 12E-G are a two dimensional projection, in which the block is projected onto a two dimensional surface represented by the screen. In other embodiments, instead of a virtual block that appears to have four faces, the virtual block may have only three faces, which the user swipes between to see different sides, or may have five or more sides, for example. The method can also be comprised of a spin around a diagonal (45 degrees from center) axis whereby the top left and bottom right or the top right and bottom left corners are fixed in space allowing for one of the alternate corners to come forward with the opposing corner receding into the foreground.

In other embodiments, the pole spin may be a partial pole spin. In a partial pole spin, a horizontal spin may be performed, where only a section of the screen (or only a section of the block) appears to turn between 90 and 180 degrees exposing a new content on the newly exposed face of the block. An example, of a partial pole spin can be understood by envisioning three square blocks that are stacked on top of each other with all the blocks' corners vertically aligned. One of the blocks is then spun 90 degrees, exposing a new face on the spinning block, leaving the other two blocks stationary or unmoved. The newly exposed may face have new content and/or may provide a new function, by providing a new button or link not previously exposed. For example, in FIGS. 12B-D and 12E-G, the top and bottom portions of the screen above and below the block that is rotating may be the faces of blocks that are currently not rotating, but are rotatable in the same way that the middle block rotates, optionally, the top and/or bottom blocks may show available functions that may be selected. In another embodiment of FIGS. 12B-J, the frame, screen, portion of a frame, and/or portion of a screen may be spun vertically instead of, or in addition to horizontally.

FIGS. 12K-N show an example of a pole spin in which the entire screen is spun. The region spun may contain a single frame, image, or document, or in another embodiment may contain multiple images or documents. FIGS. 12O-R show an example of a pole spin in which only one tile of a grid is spun. The different tiles may each be different frames or images (depending on the embodiment and/or the settings chosen by the user). FIGS. 12S-V show an example of a pole spin in which only the top third of the screen is spun. The regions spun may be a single image, frame, carousel (depending on the embodiment and/or the settings chosen by the user)

FIG. 13 shows a mobile system 1300. Mobile system 1300 may include center panel 1355, user 1390, arrows 1391, and panoramic image 1399. In other embodiments system 1300 may not have all of the elements or features listed and/or may have other elements or features instead of or in addition to those listed.

FIG. 13 shows a diagram of an embodiment of the manner in which panoramic images may be viewed—the 360 degree view frame 1300. The 360 view frame (which may be implemented by the panorama module 125) allows the user to view a panoramic image using the screen provided by the mobile device.

Center panel 1355 shows a depiction of portion of a panoramic image 1399. The panoramic image 1399 is represented as a series of parallel lines, part of which would be visible were the entire image in center panel 1355. The portion of the parallel lines that are on either side of the mobile device show the part of the image that would not be shown on the screen due to the length and shape of the image. Arrows 1391 show the direction that user 1390 would need to swipe (right and left) to see the whole photo.

In contrast, FIGS. 14 and 15 illustrate a method by which a panoramic photo (e.g., or photo taken from multiple directions such as a 360 degree photo) can be viewed in a virtual perspective on a mobile device in a flat space using the system of viewing images provided herein. The panoramic viewing system 1400 includes the center panel 1455, the top panel 1465, the bottom panel 1470, the left side panel 1476, the right side panel 1480, the user 1490, the arrows 1491, and the panoramic image 1499. In other embodiments system 1300 may not have all of the elements or features listed and/or may have other elements or features instead of or in addition to those listed.

The top panel 1465, the bottom panel 1470, the left side panel 1476, the right side panel 1480 were discussed in FIG. 1B as the top panel 165, the bottom panel 170, the left side panel 176, the right side panel 180 (see also FIGS. 4-9).

In FIG. 14, the chosen panoramic image 1499 is split into sections, where part of the image is in the middle in center panel 1455. When part of the image in the center panel 1455, other parts of the image appear around the edges (e.g., in the borders—the left side panel 1475 and the right side panel 1480). The entire image may be more than just 3 panels wide, and so to see the entire image may require more swiping through multiple panels. The rest of the view (that is the part that is not in center panel 1455), or a part of the rest of the view, of "what is around the corner" is shown in the left side panel 1475 and the right side panel 1480 in a peripheral view. In some embodiments, the rest of the panoramic image is placed in the left side panel 1475 and the right side panel 1480 as well as above and below (the top panel 1465 and the bottom panel 1470) creating a sense of perspective and depth, giving the user a feeling of what is contained within the image around the corner. The frames (left side panel 1475, right side panel 1480, top panel 1465, and bottom panel 1470) are a virtual representation of what the user would see were the user to turn the mobile device around and face in a direction that is 90 degrees to the left or right (and/or up and down). Optionally, to place a different part of the image in center panel 1455 one may either swipe to a new frame or move the mobile device, and as the mobile device is moved the part of the image that is in the center panel may change similar to were central panel 1455 the view that is captured by a camera lens. In other words, when view the image captured by the lens of camera of the mobile device, as one moves the mobile device the image displayed changes. Similarly, as one moves the mobile device, when in panoramic mode, the image in the center panel 1455 changes.

FIG. 15 shows an embodiment of a manner of swiping between frames of a panoramic image 1500 and contains the same elements as FIG. 14. However, unlike the arrows 1391 in FIG. 13, in FIG. 15, the arrows 1591 left side panel 1375 and right side panels 1380 provide a preview of the part of the image that is currently not in center panel 1555. In some embodiments, the user may spin swipe to place other parts of the panoramic image 1599 in center panel 1555. In some embodiments, when a panoramic photo is chosen, the option for the panoramic screen appears. In some embodiments, the arrows showing how the user 1590 can swipe right or left appear on the screen to guide the user.

FIGS. 16-18 illustrate an embodiment of a method by which an augmented reality object (or label or other object) can be attached to a 360 photo or "pinned" to the image.

FIG. 16 shows a diagram of embodiments of a mobile system 1600 Mobile system 1600 may include the application page 1655, an augmented object 1692, and the panoramic image 1699. In other embodiments, system 1600 may not have all of the elements or features listed and/or may have other elements or features instead of or in addition to those listed. The 360 view frame augmented PINS (which may be implemented by the pin module 135, which optionally may be part of the panorama module 125)

In FIG. 16, an enhanced reality object pinned to a portion of an image. However, the enhanced reality image is on an adjacent part of the image that the user cannot see without the border previews.

Center 1655, and the panoramic image 1699 were discussed in FIG. 13 as the center panel 1355, and the panoramic image 1399.

The augmented object 1692 is an object that is pinned to the image, via pin module 135. For example, the user may swipe the panoramic image 1699 until the portion desired is in center panel 1655, and then select an option from a menu for adding the augmentation to the panoramic image 1699. In FIG. 16, augmented object is on a portion of panoramic image that is out of sight.

FIG. 16 shows a view in which the user is looking at an image located in the center frame of the system. In FIG. 16, an augmented reality object has been attached to an adjacent image. However, since in FIG. 16, the user has not turned on the 360 degree view, the user cannot see the augmented reality object. In FIG. 16, the user does not have a way of knowing which direction to swipe to find augmented object 1392

FIG. 17 shows a diagram of embodiments of mobile system 1700. Mobile system 1700 includes center panel 1755, top panel 1765, bottom panel 1770, left side panel 1775 right side panel 1770, user 1790, augmented object 1692, and panoramic image 1799. In other embodiments, mobile system 1700 may not have all of the elements or features listed and/or may have other elements or features instead of or in addition to those listed.

In FIG. 17, an enhanced reality object pinned to the image, whose preview is viewable in a border panel of the current image. The application page 1755, and the panoramic image 1799 were discussed in FIG. 13 as the center panel 1355, and the panoramic image 1399. The top panel 1765, the bottom panel 1770, the left side panel 1775 and the right side panel 1770 were discussed in FIG. 1B as the top panel 165, the bottom panel 170, the left side panel 175 or the right side panel 170.

Augmented object 1792 may be an embodiment of augmented object 1692, which was out of sight in the panoramic image 1699 in FIG. 16. However, in FIG. 17 the augmented object 1792 is partly viewable in right side panel 1770. In FIG. 17, the augmented object is represented as a dark circle. The augmented object 1792 may be located in or moved to any of the frames/borders (the top panel 1765, the bottom panel 1770, the left side panel 1775 or the right side panel 1770), but in FIG. 17, the augmented object 1792 is shown in the right side panel 1780. The edge of the frame (1780) acts as a preview to both the photo "around the corner" as well as the PINNED augmented object 1792 (which is pinned to the image 1799 that is in the frame). When the augmented reality object 1792 appears in the border panels, the user, in essence, sees a preview of the augmented reality object 1792 that has been attached to the 360 photograph. In FIG. 17, the user may be viewing the same set of images as in FIG. 16. However, now that the user has turned on the panorama module 125, right border panel 1770 appears, which shows augmented reality object in the next image.

FIG. 18 shows a diagram of an embodiment of an image in the main frame of the display, which has an enhanced reality image pinned to the image 1800. FIG. 18 has the same elements as FIG. 17, but also shows the arrows 1891

In FIG. 18, the user 1890 swipes the screen toward the left, causing the image with the augmented reality object 1892 pinned to the image to appear in center panel 1855 of the screen and/or user interface.

Code for an Embodiment of Various Modules

An example of a Spin Swipe Module is shown in Appendix 1. An example of a Swipe Spin Module is shown in Appendix 2

Figure 19:
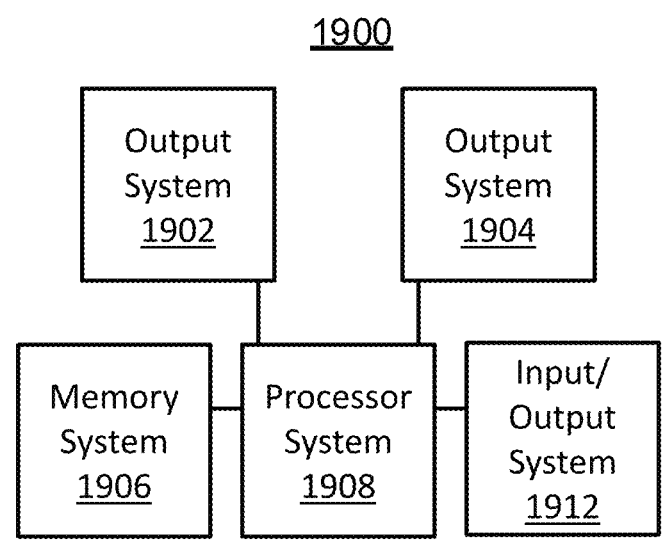
FIG. 19 shows a block diagram of a console, which may be used for viewing images.

FIG. 19 shows a block diagram of a system 1900, which may be used for viewing images. The system may include output system 1902, input system 1904, memory system 1906, processor system 1908, and input/output device 1914. In other embodiments system 1900 may not have all of the elements or features listed and/or may have other elements or features instead of or in addition to those listed.

System 1900 is an example of a system that may be used for system 100 or any of the mobile system of this specification.

Output system 1902 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 1904 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 1906 may include, for example, any one of, some of, any combination of, or all of a long term storage system, such as a hard drive; a short term storage system, such as random access memory; a removable storage system, such as a floppy drive or a removable drive; and/or flash memory. Memory system 1906 may include one or more machine readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes mediums that carry information while the information that is in transit from one location to another, such as copper wire and/or optical fiber. Memory 1906 may store machine instructions for implementing the methods described in this specification.

Processor system 1908 may include any one of, some of, any combination of, or all of multiple parallel processors, a single processor, a system of processors having one or more central processors and/or one or more specialized processors dedicated to specific tasks. Also, processor system 1908 may include one or more Digital Signal Processors (DSPs) in addition to or in place of one or more Central Processing Units (CPUs) and/or may have one or more digital signal processing programs that run on one or more CPU. Processor system 1912 implements the machine instructions stored in memory system 1910, and processor system 1912 may perform any of the methods described in this specification.

Processor system 1912 is communicatively linked to output system 1902, input system 1904, memory system 1906, and/or input/output system 1914. In formation may be passed, via processor system 1912, from any of output system 1902, input system 1904, memory system 1906, and/or input/output system 1914 to another of output system 1902, input system 1904, memory system 1906, and/or input/output system 1914. Processor system 1912 may be linked to output system 1902, input system 1904, memory system 1906, and/or input/output system 1914 by any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves. In other embodiments, information may be shared between output system 1902, input system 1904, memory system 1906, and/or input/output system 1914 without participation of the processor system.

Input/output system 1914 may include devices that have the dual function as input and output devices. For example, input/output system 1914 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 1914 is optional, and may be used in addition to or in place of output system 1902 and/or input device 1904.

Figure 20:
FIG. 20 shows an example of a screenshot of a view in which the carousel that spins in the up/down direction has been selected.
Figure 21:
FIG. 21 shows an example of a screenshot in which the carousel is rotated, which includes side panels for the middle row.
Figure 22:
FIG. 22 shows a screenshot of an example in which all rows have side panels and may be rotated up or down or left or right.

FIGS. 20, 21, and 22 are all variations of carousels that may be used for navigation and viewing content, which may be a possible progression in a search. In other embodiments, in sections discussing the carousel of FIGS. 20-22, there may be different variations of the carousel, such as there may be one x-axis and two or three y-axes, there may be one y-axis and two or three x-axes, or there may be two x-axes and two y-axes, for example.

FIG. 20 shows an example of a screenshot 2000 of a view in which the carousel that spins in the up/down direction has been selected. The screenshot 2000 includes arrows 2002 and 2003, the center panel 2010, the top panel 2015, the bottom panel 2020, the menu 2021, the application page 2055. In other embodiments system 2000 may not have all of the elements or features listed and/or may have other elements or features instead of or in addition to those listed.

In FIG. 20, in the mode selected only an up/down carousel appears. The arrows 2002 and 2003 are shown on either side of the application page 2055 indicating the direction that the user may scroll through the photos. Arrows 2002 and 2003 are for illustrative purposes and may not be part of the application. Optionally, the arrows 2002 and 2003 may be part of the application and may appear when the user has selected the up/down carousel (because the right/left movement is not possible when the user selects the up/down carousel). In some embodiments, arrows 2002 and 2003 appear on the screen after selection of the carousel. In some embodiments, the arrows appear if the user tries to rotate the carousel right or left (forgetting which carousel they chose). In some embodiments, the arrows 2002 and 2003 are shown on the screenshot to indicate the only direction the user may move the carousel. Throughout the specification the rotation of a carousel may be implemented by the user sliding or swiping a finger or stylus in the direction of the rotation.

The center panel 2010 shows a non-distorted image. This image of center panel 2010 may be the one that showed up when the user chose a folder or selection of images.

The top panel 2015 shows a foreshortened version of a photograph that is adjacent to the center photo 2010 in the carousel. The user may rotate the carousel down to move the photo in the top panel 2015 into the center panel 2010.

Similarly, bottom panel 2020 shows a foreshortened version of a photograph that is next to center photo 2010 in the carousel. The user may rotate the carousel up to move the photo in the bottom panel 2020 into the center panel 2010.

The menu 2021 is an example of a menu that may be provided with the mobile system on which the application containing the system of viewing photos is shown. Menu 2021 may include options for selecting other modes associated with the application and/or may be used to navigate to other frames of the application, images, and/or content stored on the system. In other embodiments, the menu 2021 may show in all screenshots of the system. In some embodiments, the user may tap anywhere on the menu to move out of the system of viewing a photo temporarily or to shut the system of viewing a photo down.

The application page 2055 was discussed with reference to FIG. 1B as application page 155. However, in FIG. 20, the application page shows only the up/down carousel containing three photos. The up/down carousel (the vertical carousel) has been chosen by the user.

FIG. 21 shows an example of a screenshot in which middle row has side panel, and the carousel that can be rotated with the side panels up or down or left or right 2100. FIG. 21 has all of the elements of FIG. 20, but also includes arrows 2101 and 2104, text 2111, a left side panel 2130, a right side panel 2125. In other embodiments system 2100 may not have all of the elements or features listed and/or may have other elements or features instead of or in addition to those listed.

Arrows 2101 and 2104 may be colored (e.g., green) and may optionally appear at the top and bottom of the display application page to indicate that the horizontal direction of the rotation of the carousel.

The text 2111 may be any information associated with the photo in the center. The text may be a date, a name, a place, an address, a category, or a hashtag. Text 2111 may indicate the type of subject matter that is in the row of images in which text 2111 appears, which in FIG. 21 is the center carousel that spins horizontally. In FIG. 21, text 2111 is a hashtag that may be a category that relates to the photographs of the row in which the hash tag appears. The hashtag may be a color that is viewable in the photograph. In the embodiment of FIG. 21, the font color of the hashtag is white. In some embodiments, the hashtag might be included in a text box of a different color that enables viewing the word or words in any photo.

The left side panel 2130 shows a photograph that is adjacent to the photo in center panel 2110, and may be a photo that is related in some way to the photograph in the center panel 2110 or at least part of the same category that is associated with the text 2115. In some embodiments, based on the hashtag (#FAMILY), the photographs in the other panels of the same row are related as photos categorized under the hashtag "#FAMILY." The user may rotate the carousel to the right to move the photo in the left side panel into the center panel 2110.

The right side panel 2125 shows a photograph that the application has associated with the same hashtag as the photograph in the center panel 2110. In some embodiments, based on the hashtag (#FAMILY), the photographs in the other panels are related as family photos. The user may rotate the carousel to the left to move the photo in the right side panel into the center panel 2110.

FIG. 22 shows a screenshot of an example in which all rows have side panels and may be rotated up or down or left or right. FIG. 22 has all of the same elements as FIG. 21, but also includes corner panels (2240 and 2245) flanking top panel 2215, side panels (2230 and 2225) flanking the center panel 2210, and corner panels (2250 and 2260) flanking the bottom panel photo 2220. In addition, FIG. 22 shows that text 2213 can be included on the top panel photo 2215, text 2211 can be included on the center panel photo 2210, and text 2212 can be included on the bottom panel photo 2220. The images in top row may all be associated with the text 2213, the images in the middle row may be associated with the text 2111, and the image in the bottom row may all be associated with text 2112, and the texts 2111, 2112, and 2113 indicate the category of their respective rows. In an alternative embodiment, each column may have text labeling the subject matter of that column.

Optionally, in FIG. 22 when one rotates a carousel upward or downward the content of each row moves vertically together as one row, so that if one rotates a carousel upward enough to move one panel upward, the image(s) of the top row move off screen, the image(s) of the middle row move to the top row, the image(s) of the bottom row move to the middle row, and new content fills the bottom row of panels. In an embodiment, any of the three rows may be rotated up, down, left, or right. The number of x-axes or rotation does not need to be the same as the number of y axis. For example, there may be 3 x-axes of rotation and only one or two y axis of rotation or there may be 3 y axis of rotation and only one or two x axis of rotation. Similarly, there may be one x axis of rotation and only one or two y axis of rotation or there may be one y axis of rotation and only one or two x-axes of rotation. Optionally, only a section of the screen may be flipped or rotated. FIG. 22 shows an option, within a rotation progression, where a photo was selected from FIG. 21, and a number of choices of similarly categorized photos groups are then shown on the horizontal axis. In FIG. 22, the side panels are shown along both axes (when an x/y construct is present—that is when rotation along both the x and y axis is activated) irrespective of the direction of spin. FIG. 22 shows one of many potential progressions. After choosing an image on the third step of the progression, which is associated with FIG. 22, it is possible that one direction is shown corresponding to categories associated with that image (e.g., date, hashtag etc.). In the example of FIG. 22, each row relates to a different type of subject matter. The top row relates friends, the middle row relates to family and the bottom row relates to pets. In another embodiment, each column may relate to different subject matter. For example, each row (or column) may include the content of a different folder or of a different directory of a file storage system.

Although in FIGS. 4-9, 14, 15, 17, 18, 21 and 22, for example the border panels are located along a horizontal and/or vertical axis above, below, to the right and to the left of the center panel, the side panels or border panels may be located at other angles and/or orientations, such diagonally above and below the center frame. For example, the center frame may be diamond shaped and the border panels may be located parallel to the borders of the diamond. Additionally, the center panel may have other shapes (pentagonal, hexagonal, octagonal, decagonal, etc.), and the border panels may be located parallel to the borders of the shape.

Figure 23:
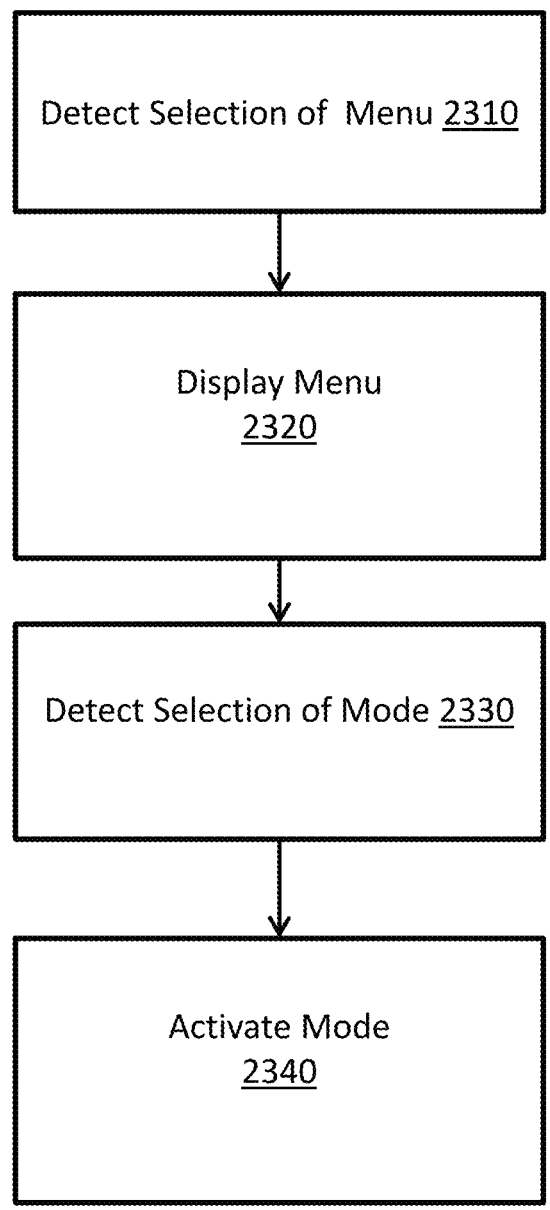
FIG. 23 shows a flowchart of an embodiment of choosing the menu and module for the system for viewing an image from the viewpoint of the system.

FIG. 23 shows a flow chart of an embodiment of method 2300 in which a user activates the system of viewing an image application from the viewpoint of the system.

In step 2310, system 100 detects that the user has selected the menu (Menu 263 in FIG. 2) for the system for viewing an image by clicking on an icon in the menu bar of the user device or by some other method. In some embodiments, the user the user may first open the current application for the system for viewing an image using the menu 263.

In step 2320, system 100 displays a menu including a variety of modes for operation of the system for viewing an image. Optionally the menu for the system for viewing an image on the mobile device may include options for selecting and/or activating any of the modules and/or functions of the modules of the system for viewing an image of FIGS. 1-22. The modes listed in the menu 263 may include, but are not limited to, a spin swipe (105), a rotation (110), a swipe frame (120), a panorama (125), an orientation (130), a pin (135), and a pole spin (see FIG. 1 numerical identifications for the modules). In some embodiments, the mode may be represented in the menu by including a type of an image (e.g., an icon, a panoramic image, an image), specific directories of images (types of images, content, dates) and views for the system, including a view with pane panels or without, how many images will be shown on the screen and/or the number of carousels, a view with only images or a view that includes social networks and other pane panel options, include hashtags, a view that includes three dimensional views or a view that includes two dimensional views of the images, etc.

In step 2330, system detects 100 that the user has selected a mode for implementing the system for viewing an image. The system may detect that the user has selected a specific mode in a number of different ways, including detecting that the user touched or pressed the icon representing the specific mode in the menu, in a pane panel, or in the image itself. The system may detect that the user has selected a specific mode by the movement of the user's finger or an object touching the screen. The detecting of the selection of the mode is discussed in more detail in FIG. 24, which is an embodiment of how the system may determine a type of motion and distribution of points selected on the screen.

In step 2340, system 100 activates the mode chosen by the user, which may involve calling one or more machine instructions, routines, modules, logic, and loading the instructions into the cache of the processor system and/or sending a signal to a logic gate, electronic switch and/or threshold device that causes the module to turn on. In some embodiments, some of the modes may be modes that the user still needs to sets up when the user sets up system 100 for viewing images, such as which modes are activated by default when the user does not specify a certain mode.

In an embodiment, each of the steps of method 2300 is a distinct step. In another embodiment, although depicted as distinct steps in FIG. 23, step 2310-2340 may not be distinct steps. In other embodiments, method 2300 may not have all of the above steps and/or may have other steps in addition to or instead of those listed above. The steps of method 2300 may be performed in another order. Subsets of the steps listed above as part of method 2300 may be used to form their own method.

Figure 24:
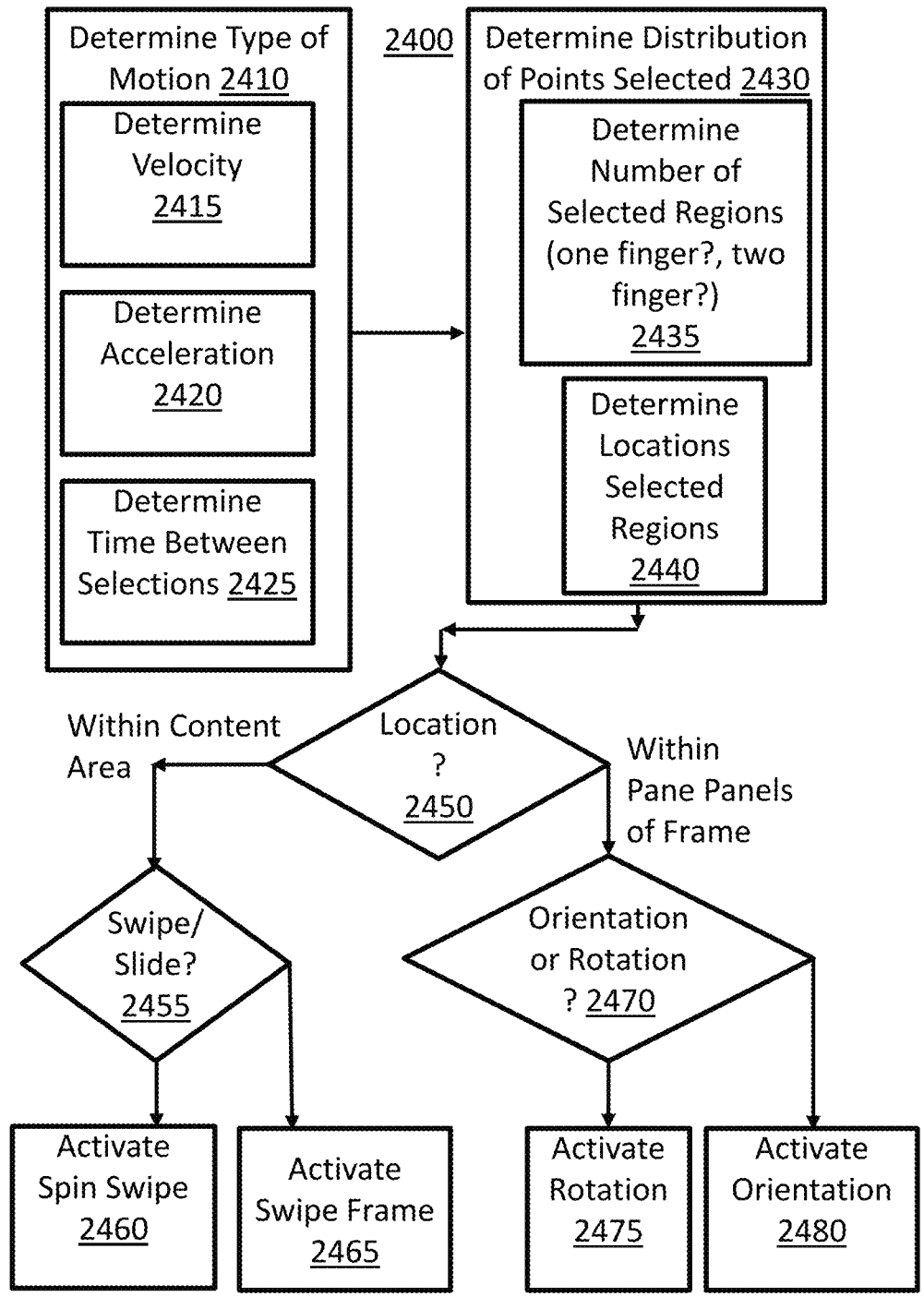
FIG. 24 shows a flowchart of an embodiment of performing the functions of the system for viewing an image from the viewpoint of the system using the modules of the system.
Figure 25:
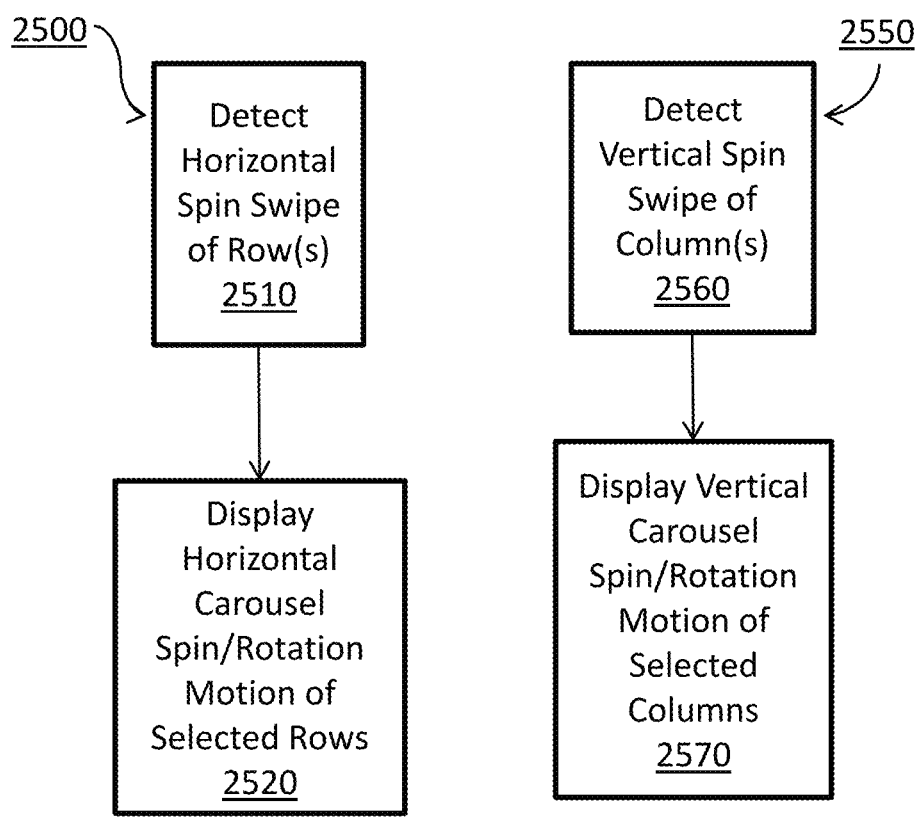
FIG. 25A and FIG. 25B show a flowchart of an embodiment of performing the horizontal and vertical swipe functions of the system for viewing an image from the viewpoint of the system.

FIG. 24 shows a flowchart of an embodiment of method 2400 in which the system 100 may detect the selection of a mode, without the use of the menu and method 2300 and/or as a supplement to the use of a menu and/or method 2300.

In step 2410, upon detecting motion that the screen of the display is being touched or input from a pointing device (such as a mouse, trackball, and/or touch pad), system 100 determines the nature of the motion. Steps 2415, 2420, and 2425 are optional substeps of step 2410.

In step 2415, system 100 determines the velocity of the touching the screen or touch pad. System 100 may detect the velocity of a cursor, the velocity of any object touching the screen or touch pad and/or the velocity of a finger touching the screen or touch pad. The velocity may be an indicator whether the motion is a slide or a swipe.

In step 2420, system 100 determines the acceleration of an object touching the screen or touch pad and/or the acceleration of a cursor, which also may indicate whether the user is sliding a finger or swiping a finger, for example. Determining the type of motion may help with determining whether the motion is a swipe, a spin, a selection (holding the finger in one place), how much of a swipe, and system 100 may determine whether the motion is a combination of the motions. Determining the velocity 2415 may involve determining how quickly the user is swiping (e.g., a carousel) and may determine how quickly the carousel or the rotation turns. Determining the velocity 2415 may determine how quickly the user spins through a selection of images for example or a selection of social media links. Determining the acceleration 2420 may be combined with determining the velocity 2415 to identify how quickly a carousel should spin.

In step 2425, the time between selections is determined, which may be used to identify whether the user performed a double tap or a single tap. Step 2425 may be used to identify whether the user means to change from one panel or image to another.

The combination of determining the velocity 2415, the acceleration 2420, and/or the time between selections 2425 provides information to system 100 to identify the type of motion, which may be used to determine which mode of operation to activate. In some embodiments, if some part of the motion is unclear (e.g., determining the velocity 2415, determining the acceleration 2420 and determining the time between selections 2425), system 100 may activate a query to identify what the user wants the motion to be, such as (should an image carousel spin right or left or up or down). In some embodiments, if the intended motion is unclear, system 100 provides a choice of a variety of options for the next action that the system should take (e.g., which mode to activate) and/or the movements intended (e.g., spin, swipe, or pin, etc.) and then provides a list of choices from which the movements may be chosen of what element of the motion should change or move (the carousel, the panel, etc.) to clarify what the user intended.

In step 2430, system 100 determines the distribution of points selected by the user. Determining the distribution of points selected by the user may include determining whether the distribution of the points selected correspond to the user touching the touchscreen at multiple points and the number of points contacting the touchscreen.

Step 2430 may include optional substeps 2435 and 2440. In step 2435 a determination is made of the number of regions selected simultaneously (e.g., is one finger or two fingers in contact with the touchscreen). Step 2435 may involve determining how far apart points on a touch screen or touchpad are that have been activated by a touch. In step 2440 determination of the locations of the selected regions that have been selected (e.g., whether the location(s) are in a panel, where they are in a panel, what type of panel). In other words, via the combination of step 2435 and 2440 system 100 determines where on the screen the user is touching and whether the user is using one finger or more.

In some embodiments, when the user selects a point with one finger, the system identifies the image or panel as "selected" by the user and waits to determine what the user wants to do with the selected image or panel. In some embodiments, the system also identifies the amount of time the touch is not mobile. If the amount of time is above a threshold, the user may intend to push on a button, and/or distinguish between a very slow swipe and a selection. For example, if the user's finger does not move for between 0.2 and 2 seconds, system 100 may identify the contact as a selection of a tool, link, function, and/or mode associated with the region that detects the contact, while if the finger moves during the 0.2 and 2 seconds, system 100 may classify the movement as a slow swipe. In some embodiments and/or modes, an icon may be shown (e.g., a dot or bull's eye) or a coloring or shading may change at the point or location on the screen that the user has selected to show the user that the user selected a specific point on an image, an image, or panel. In some embodiments, when the user uses two fingers, the system identifies the two finger as two points and, as a result, the system performs a different function, such as, for example, two fingers moving in a circular-like motion along the border panel panels may activate a spin or rotation of an image or of the borders.

In step 2450, system 100 identifies whether the location is within the content area or is within pane panels of the frame. For example, system 100 may store an association between pixel coordinates and elements currently being displayed on the image and may determine the pixel coordinates at which the screen has been touched. System 100 then determines the image element that the pixel elements touched are associated with. System 100 may then further determine a function associated with the image elements and may determine that the type of screen input activates that function. In this example, in step 2450, system 100 determines whether the location is a location associated with the image element of border panel or the content panel. In some embodiments, system may provide a page of the application in which the user is provided with an option, via a menu icon displayed on the top of the page, or may be provided with an option to go back to a page having the menu at the top of the screen of the mobile device at any time to change the mode or to go back to a previous screen. If in step 2450 it is determined that the location is within a pane panel, system 100 proceeds to step 2455.

In step 2455, if the location is within the content area, and the system determines whether the user performed a swipe or slide function and the method proceeds to step 2460. If the user performs a swipe, then in step 2460, system 100 activates the spin swipe module 105 of FIG. 1.

Returning to step 2455, if in step 2455 it is determined that the user performed a slide, then method 2400 to proceeds to step 2465.

In other words, if the user performs a slide, then in step 2465, system 100 activates the swipe frame module 120 in FIG. 1.

Returning to step 2450, If in step 2450 it is determined that the location is within a content area method 2400 proceeds to step 2470.

In step 2470, if the location is within the pane panels of the frame, then the system determines whether the user performed a rotation or orientation function. In some embodiments, the user may choose between an orientation and a rotation function by going to the menu at the top of the screen and choosing one or the other function from a list of modes. In an alternative embodiment, if the user swipes up, for example, optionally, the system may provide a query window to ask the user whether they want to perform an orientation or a rotation function. In some embodiments, the choice of orientation or rotation function may depend on which part of the pane panel the user touches. For example, if the user touches the middle of the panel, the rotation function may be activated and if the user touches the top or bottom of the panel, the orientation function may be activated. In some embodiments, a small icon within the pane panel may show the user which part of the panel to touch to activate the orientation or rotation function (the user touches the icon for rotation or the icon for orientation). In an alternative embodiment, if the user uses 1 finger, the rotation function is activated and if the user uses two fingers, the orientation function is activated. If in step 2470 it is determined that a rotation has been selected, method 2400 proceeds to step 2475.

In step 2475, the system rotates the pane panel that is selected. The rotation function rotates the carousel in the direction of the user's movement. The rotation movement has been discussed in FIG. 1 in more detail and may be implemented by the rotation module 110 in FIG. 1.

Returning to step 2470, if in step 2470 it is determined that an orientation has been selected, method 2400 proceeds to step 2480.

In step 2480, if the location is within the pane panels of the frame, and the user performed an orientation movement, then the system activates an orientation function. The orientation function has been discussed in more detail in FIG. 1 and may be implemented by the Orientation Module 130.

In an embodiment, each of the steps of method 2400 is a distinct step. In another embodiment, although depicted as distinct steps in FIG. 24, step 2410-2480 may not be distinct steps. In other embodiments, method 2400 may not have all of the above steps and/or may have other steps in addition to or instead of those listed above. The steps of method 2400 may be performed in another order. Subsets of the steps listed above as part of method 2400 may be used to form their own method.

FIG. 25A shows a flowchart of an embodiment of method 2500 in which the system 100 may detect a horizontal spin swipe that results in the spinning of a carousel.

In step 2510, the system 100 detects a horizontal spin swipe of one or more row(s). The manner of detecting a horizontal spin swipe is described in FIG. 24. In some embodiments, the system 100 may only turn one carousel at a time. In some embodiments, the system 100 may turn more than one carousel at a time if the user chooses more than one carousel. In some embodiments, the horizontal spin swipe is implemented by the Spin Swipe Module (see 105 in FIG. 1). The row may be any horizontal combination of images or frame panels that are arranged in an approximately horizontal plane (e.g., a y-axis). For example, in FIG. 1B, system 100 detects the user's finger 190 being swiped either right or left horizontally (e.g., with the intent to spin the carousel associated with the center panel 160, the left panel 175, and the right panel 180).

In step 2520, in response to step 2510, system 100 displays a horizontal carousel spin/rotation motion of the selected row(s). The spin swipe motion may spin any of the carousels in the y-axis on any of the rows of the screen. The horizontal Spin Swipe results in spinning of the carousel that includes the panel that started the motion. In FIG. 1B, if the carousel is spun right one panel, the left panel 175 moves into the center panel position 160 resulting in rotation of the carousel one panel.

In an embodiment, each of the steps of method 2500 is a distinct step. In another embodiment, although depicted as distinct steps in FIG. 25A, step 2510-2520 may not be distinct steps. In other embodiments, method 2500 may not have all of the above steps and/or may have other steps in addition to or instead of those listed above. The steps of method 2500 may be performed in another order. Subsets of the steps listed above as part of method 2500 may be used to form their own method.

FIG. 25B shows a flowchart of an embodiment of method 2550 in which the system 100 may detect a vertical spin swipe that results in the spinning of a carousel.

In step 2560, the system 100 detects a vertical spin swipe of one or more column(s). The manner of detecting a vertical spin swipe is described in FIG. 24. In some embodiments, the vertical spin swipe is implemented by the Spin Swipe Module (see 105 in FIG. 1). The column may be any vertical combination of images or frame panels that are arranged in an approximately vertical plane (e.g., an x-axis). For example, in FIG. 2, system 100 detects the user's finger 290 swiping up or down (with the intent to spin the carousel associated with the center panel 260, the top panel 265, and the bottom panel 270).

In step 2570, in response to step 2560, the system 100 displays a vertical carousel spin/rotation motion of the selected column(s). The spin swipe motion may spin any of the carousels in the x-axis on any of the column(s) of the screen. The vertical Spin Swipe results in spinning of the carousel that includes the panel that started the motion. In FIG. 2, if the carousel is spun up one panel, the bottom panel 270 moves into the center panel position 260 resulting in rotation of the carousel one panel. In some embodiments, if the carousel is spinning, the user may stop the carousel on the correct image or panel by touching any part of the spinning carousel. In some embodiments, the velocity and acceleration of the spin may determine how many images or panels will spin up or down and, as part of detecting the vertical spin swipe, the system 100 detects the velocity and acceleration (see also, FIG. 24).

In an embodiment, each of the steps of method 2550 is a distinct step. In another embodiment, although depicted as distinct steps in FIG. 25B, step 2560-2570 may not be distinct steps. In other embodiments, method 2550 may not have all of the above steps and/or may have other steps in addition to or instead of those listed above. The steps of method 2550 may be performed in another order. Subsets of the steps listed above as part of method 2550 may be used to form their own method.

Figure 26:
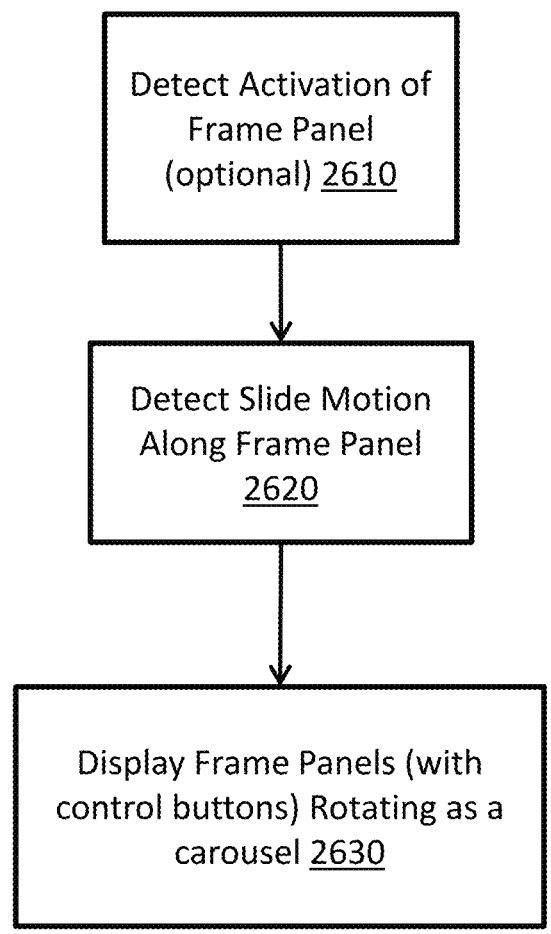
FIG. 26 shows a flowchart of an embodiment of performing the slide frame functions of the system for viewing an image from the viewpoint of the system.

FIG. 26 shows a flowchart of an embodiment of method 2600 in which the system 100 may detect and perform the slide frame functions of the system for viewing an image from the viewpoint of system 100. The slide frame functions may also be called border rotations. In some embodiments, the border rotations are implemented by the rotation module 110 in FIG. 1.

In optional step 2610, the system 100 detects activation of a frame panel. The system 100 may detect a finger or other object touching the border or frame panel. The system 100 may detect the finger or other object touching the panel using methods such as those discussed in FIG. 24. This step is optional because the user may choose the frame panel rotation function from a list of modes in the application menu.

In step 2620, the system 100 detects a slide motion along the frame panel. In some embodiments, the border rotation may be activated by a movement along the border that slides the border up, down, right or left (e.g., the finger may move right to start the border spinning clockwise) and the system 100 can detect the movement as a border carousel spin. In some embodiments, the movement is detected by a method discussed in FIG. 24.

In step 2630, in response to step 2610, the system 100 displays the frame panels with control buttons rotating as a carousel in the direction of the slide. This motion is shown in FIGS. 6 and 7. For example, in FIG. 6 the user is touching the left pane panel 675 (also called a border panel or a frame panel) with the twitter icon and swiping up or down to start rotation of the pane panels via a carousel (see the arrows in the left pane panel 675). The velocity and acceleration of the movement may affect how quickly the rotation occurs. Although not shown in FIG. 6, the user can choose to stop the rotation. In some embodiments, the user can stop the rotation movement by touching one of the panels. In some embodiments, the user can choose which panel they want and in which specific position (e.g., put the social media panel in the right border position) via the menu.

In an embodiment, each of the steps of method 2600 is a distinct step. In another embodiment, although depicted as distinct steps in FIG. 26, step 2610-2630 may not be distinct steps. In other embodiments, method 2600 may not have all of the above steps and/or may have other steps in addition to or instead of those listed above. The steps of method 2600 may be performed in another order. Subsets of the steps listed above as part of method 2600 may be used to form their own method.

Figure 27:
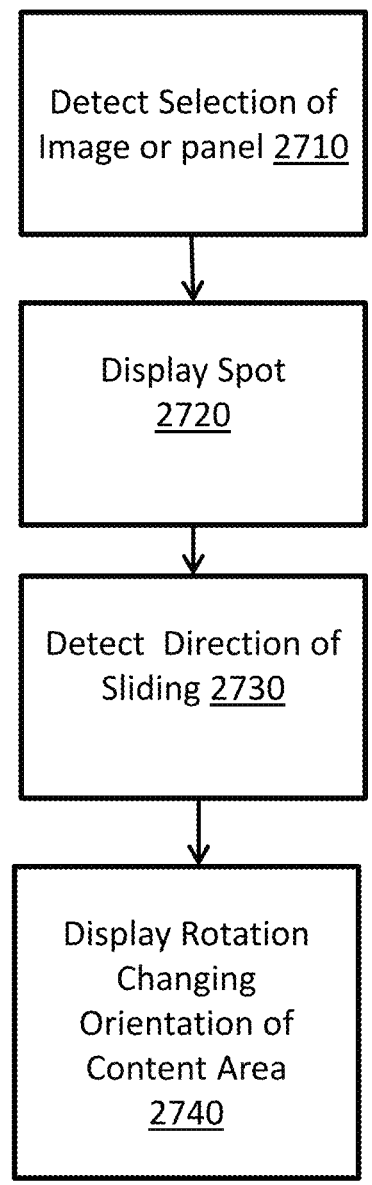
FIG. 27 shows a flowchart of an embodiment of performing the image rotation functions of the system for viewing an image from the viewpoint of the system.

FIG. 27 shows a flowchart of an embodiment of method 2700 in which the system 100 may detect and perform the orientation functions of the system for viewing an image from the viewpoint of the system. In some embodiments, the orientation function is implemented by the Orientation Module 110 in FIG. 1.

In step 2710, the system 100 detects the selection of an image or panel. The system 100 may detect the selection of the image in the same ways discussed in FIG. 26, step 2610 (e.g., by detecting the selection of a menu item). This step is optional and/or may occur later in the method because the user may activate the orientation function, choose the image, and choose the change in orientation using the application menu.

Optionally, in step 2720, the system 100 displays a spot. The spot may be displayed in the area touched by the user. For example, in FIG. 11, a spot or circle 1199 shows up in the area where the user touched the image (the top right corner of the image) and allows the user to view the movement they will be making with their finger. The spot may be temporary and may be visible only during the performance of the motion.

In step 2730, the system 100 detects the direction of sliding. This may refer to the movement that the user's finger makes as the user changes the orientation of the image (or icon or panel or other symbol displayed on the panel or image). For example, in FIG. 11, the user pulls the spot down. In some embodiments, the system 100 may detect the direction of sliding and the sliding movement using the methods provided in FIG. 24.

In step 2740, the system 100 displays rotation changing the orientation of the content area. The method is shown in FIGS. 10-11 and 12A. The user 1190 pulls the spot down resulting in an orientation change in the image 1295 in FIG. 12A, "righting" the image so that the sky is shown at the top and the bottom of the hills are shown at the bottom in FIG. 12. In some embodiments, the orientation procedure may change the image from landscape to portrait (as shown in FIGS. 11 and 12). In some embodiments, the user may choose the amount of rotation via the menu or via a box that shows up when the user starts the motion or chooses orientation from the application menu. For example, the user may choose to turn the image 90°.

In an embodiment, each of the steps of method 2700 is a distinct step. In another embodiment, although depicted as distinct steps in FIG. 27, step 2710-2740 may not be distinct steps. In other embodiments, method 2700 may not have all of the above steps and/or may have other steps in addition to or instead of those listed above. The steps of method 2700 may be performed in another order. Subsets of the steps listed above as part of method 2700 may be used to form their own method.

Figure 28:
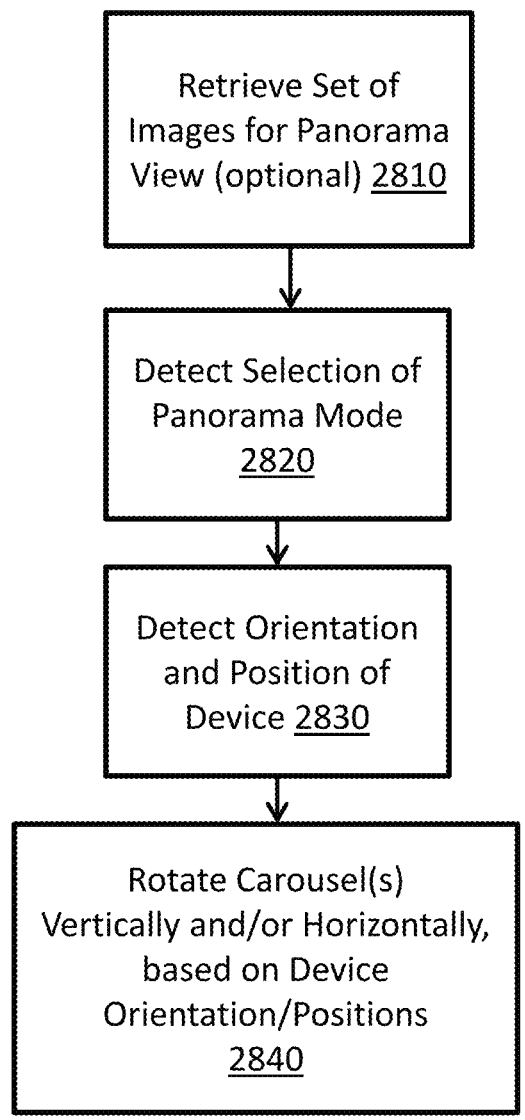
FIG. 28 shows a flowchart of an embodiment of performing the panoramic functions of the system for viewing an image from the viewpoint of the system.

FIG. 28 shows a flowchart of an embodiment of a method 2800 in which the system 100 may detect and perform the panoramic functions of the system for viewing an image from the viewpoint of the system. In some embodiments, the panorama function is implemented by the Panorama Module 125 in FIG. 1.

In step 2810, optionally, the system 100 retrieves a set of images for the panoramic view. In some embodiments, the set of images comes from images contained in the user's library of images stored by the system 100. In other embodiments, the system 100 sends the user a link asking the user to choose one or more images from a variety of locations, including but not limited to, the user's computer, the internet, the user's library of images, the user's emails, and a social media link. In some embodiments, the user may already have a panoramic image that may be retrieved by the system 100 or is saved on the system 100. In some embodiments, if one or more of the set of images does not have a matching area, the system 100 may ask the user to choose a different image. Optionally, camera module 130 may have a panorama mode, which causes the camera to take panoramic pictures, which may be stored as a panoramic picture and or may cause panorama module 125 to open for viewing the image taken.

In step 2820, the system 100 detects the selection of the panorama mode. In some embodiments, the panorama mode may be activated by choosing the mode from a list of modes in the application menu. In some embodiments, a movement or combination of movements on the screen by the user or an object may activate the panorama mode 125 and the system may detect the movement or the combination of movements. Optionally, taking a panorama picture, via camera module 130, may cause system 100 to detect the selection of the panorama mode 125.

In step 2830, the system 100 detects the orientation and position of the user's device. As will be elaborated upon in step 2840, which part of the panorama image is displayed may be depend on the orientation of system 100. The orientation of the system 100 includes which direction the display is facing (e.g., North, South, East, or West), whether the display is facing up or down or an angle somewhere in between, such as 45 degrees or 135 degrees. In step 2830, the system may determine which part of the image may be shown in the middle panel and which part of the image will need to be included on other panels. For example, in FIG. 13, only a portion of the image 1399 is shown on the screen. In FIG. 14, parts of the image 1399 are displayed on the left and right panels (1475 and 1480).

In step 2840, and in response to step 2830, the system 100 rotates one or more carousels vertically and/or horizontally, based on the device orientation/positions. In FIG. 15, the user 1590 is moving through a vertical carousel by moving system 100 right or left (as shown by the arrows). The idea is to create an effect such that the part of the panoramic image that is viewed changes giving the effect that the display is a window to the world in which the panoramic image is the physical world, and, to see the entire view, one needs to move the window around. For example, if one walks to the right holding the screen straight in front of them the image shifts to the right so that one sees what was to the left of what was previously in the display. If the panorama includes a mountain, the user may need to angle the display so that the display partly faces the ground to see the top of the mountain, similar to attempting to see a view via the display when system 100 is in a viewfinder mode.

In an embodiment, each of the steps of method 2800 is a distinct step. In another embodiment, although depicted as distinct steps in FIG. 28, step 2810-2840 may not be distinct steps. In other embodiments, method 2800 may not have all of the above steps and/or may have other steps in addition to or instead of those listed above. The steps of method 2800 may be performed in another order. Subsets of the steps listed above as part of method 2800 may be used to form their own method.

Figure 29:
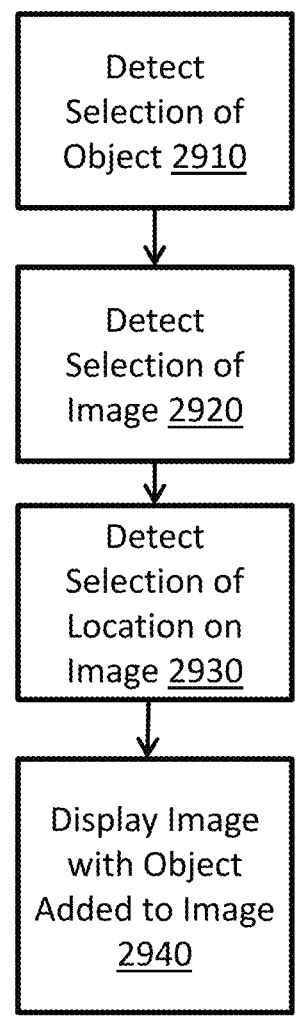
FIG. 29 shows a flowchart of an embodiment of performing the enhanced reality object pinning functions of the system for viewing an image from the viewpoint of the system.

FIG. 29 shows a flowchart of an embodiment of method 2900 in which the system 100 may detect and perform the enhanced reality object pinning functions of the system for viewing an image from the viewpoint of the system. In some embodiments, the pinning function is implemented by the Pin Module 135 in FIG. 1. In some embodiments, pinning may be used to move an object into view in a panoramic image. In some embodiments, pinning may be used to put an object into a panoramic image in a location chosen by a user. Method 2900 may be used for adding dot 1692 (or another virtual object) to an image.

In step 2910, the system 100 detects the selection of an object. The system 100 may detect the selection of the object in the same ways discussed in FIG. 26, step 2610 (e.g., by detecting the selection of a menu item). In some embodiments, this method may occur during the production of a panoramic image in FIG. 28. For example, the user may want to add to the image of an airplane or a cartoon character to a picture or a panoramic picture (a virtual enhancement of the image).

In step 2920, the system 100 detects the selection of an image. The system 100 may detect the selection of the image in the same ways discussed in FIG. 26, step 2610 (e.g., by detecting the selection of a menu item). In some embodiments, the user may scroll right or left and/or up or down, through a series of images or portions of a panoramic image until the user has found an image or a portion of a panoramic image to which the user would like to add the object, then system 100 may detect an action indicating that the user has chosen the desired image or portion of the image (e.g., such as by detecting a single or double tap on the display) or by a cessation in movement for a predetermined amount of time (e.g., the user has not scrolled for 0.5 seconds).

In step 2930, the system 100 detects the selection of a location on the image. The system 100 may detect the selection of the location on the image in the same ways discussed in FIG. 26, step 2610 (e.g., by detecting the selection of a menu item). In some embodiments, the system 100 may detect that the user has chosen the location on the image by a movement by the user (e.g., a double tap on the screen in the location). In some embodiments, the system 100 may detect the location on the image by detecting the user's choice of a mode in the application menu and then requesting that the user now choose a location on the image for the object. In an embodiment, the same action that selects the image also selects the location of the object on the image or the portion of the image.

Steps 2910, 2920, 2930 may be performed in any order and/or concurrently.

In step 2940, the system 100 displays the image with the object added to the image in the chosen location. Thus, for example, in FIG. 18, the object 1855 is shown in the top center of the image 1899 because the user chose that position for the object.

In an embodiment, each of the steps of method 2900 is a distinct step. In another embodiment, although depicted as distinct steps in FIG. 29, step 2910-2940 may not be distinct steps. In other embodiments, method 2900 may not have all of the above steps and/or may have other steps in addition to or instead of those listed above. The steps of method 2900 may be performed in another order. Subsets of the steps listed above as part of method 2900 may be used to form their own method.

Figure 30:
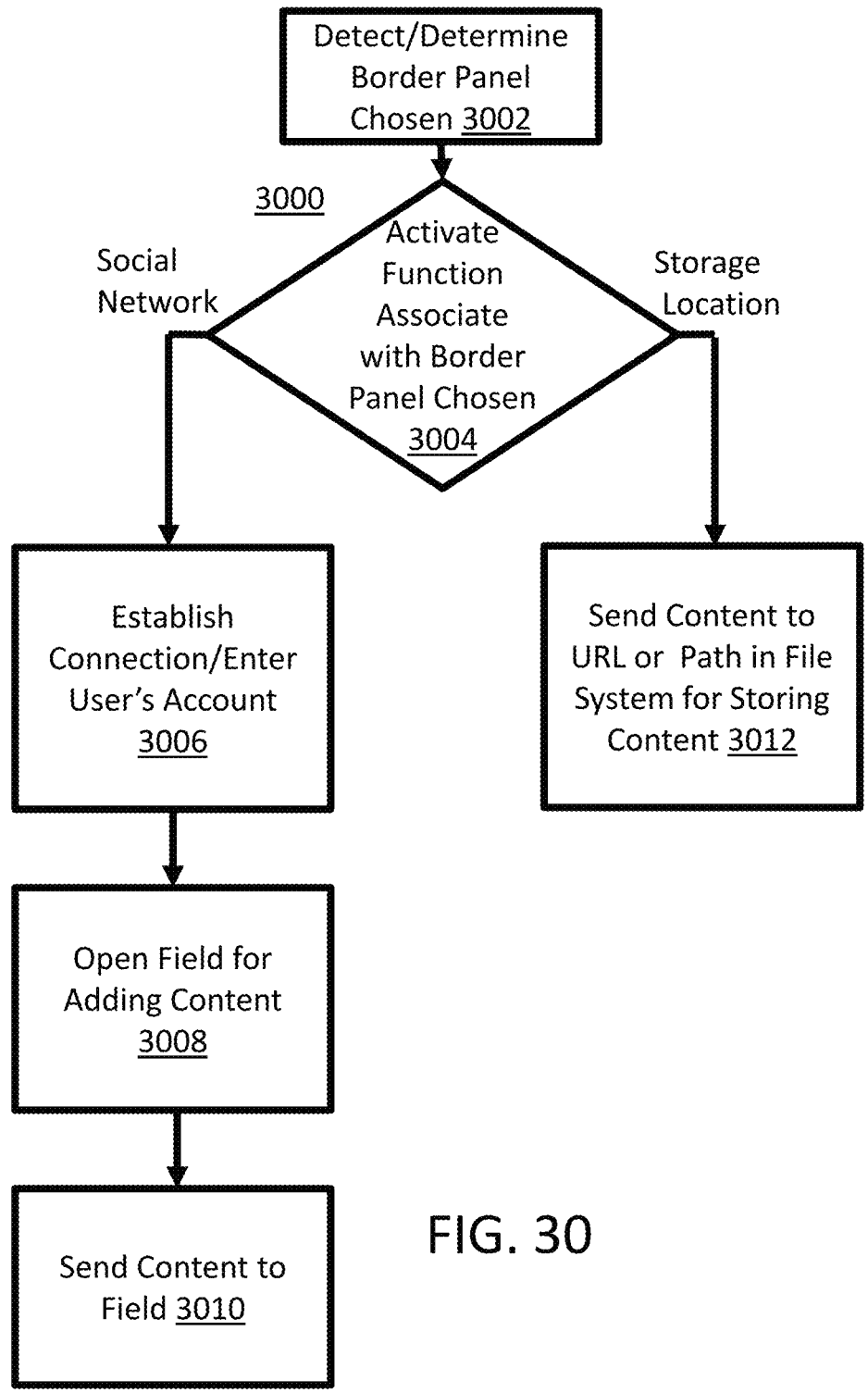
FIG. 30 shows an embodiment of a method for implementing a border swipe.

FIG. 30 shows an embodiment of a method 3000 for implement a border swipe. In step 3002, a determination is made of which border panel was selected. The determination may depend on which direction the user swiped. The border panel towards which the user swipes is the chosen panel. In step 3004, the function associated with the border panel chose is activated. For example, if the border panel is a social network, the function associated with opening, storing, and/or posting content on that social is selected. If the border panel is a local storage area, the function may be storing the content at that local storage area.

Step 3006 begins an example of a function that may be associated with a social media or other network based service. In step 3006, a connection is established with the server or other node associated with the social network or other service. Step 3006 may involve a handshake and/or a login process. In step 3008, a field is opened for entering content. The field may be for entering constant to be posted to the wall of a social network. For example, if the social network is Twitter (r), and the content being swiped is a text message, the field may be a field for entering content to appear in a tweet. Step 3006 may include opening a browser or initiating another file transfer protocol. As another example, the field may be for entering an image that will appear in a tweet or on the wall of another social network. In step 3010, the content is uploaded to the server or other node and added to the field.

Steps 3006-3010 may be performed by Application Program Interface (API) calls to the social network, remote storage area, and/or other location. Alternatively, steps 3006-3010 may be implemented by a bot simulating a human.

Returning to step 3004, if the border panel is associated with a storage location, the function associated with border panel may be step 3012, which is a store function. The function may include a path, an address of a directory, an address of a folder where the content will be stored. If the location is a remote storage location, there may be a login and/or a handshaking process similar to step 3006 that also needs to be performed, and the location where the file is to be stored may be specified as a URL.

In an embodiment, each of the steps of method 3000 is a distinct step. In another embodiment, although depicted as distinct steps in FIG. 30, step 3002-3012 may not be distinct steps. In other embodiments, method 3000 may not have all of the above steps and/or may have other steps in addition to or instead of those listed above. The steps of method 3000 may be performed in another order. Subsets of the steps listed above as part of method 3000 may be used to form their own method.

Alternatives and Extensions

In some embodiments, the system 100 may also include a third and fourth carousel. The third and fourth carousel each have a diagonal axis of spin that is between the vertical and horizontal x and y-axis. For example, the direction of spin can be located at 45 degrees from either x and/or y-axis. The third and fourth carousel may have the same characteristics, as the described regarding the x and y-axis. Optionally, the axes may be at other directions, and there may be a different numbers of directions. Thus, any of the embodiments, shown in FIGS. 2-5 may have a third and fourth carousel. It is envisioned that the carousels will be included in pairs, having opposite movements (up/down vs right/left), etc. However, in some embodiments there may be an odd number of carousels.

The system 100 may include an assortment of filters. For example, the system 100 may include a "photo effects" filter. For example, a photo may be taken and then a user enters the filter effect progression. In one embodiment, after the photo is taken, the newly taken photo appears at the intersection of the x and y-axis. For example, the y-axis (FIG. 2) may appear in the visual forefront (in an alternative embodiment the x-axis or another axis may appear in the forefront). Each of the frames within the y axis (or other axis that is in the foreground) may contain a description and may include one visible-choice (or optionally multiple visual choices) of general filters that the user may select, such as contrast, brightness, red, blue, yellow, green, magenta, cyan, and/or other color filters etc. To view more available choices for filters, a user may spin swipe through the choices until finding the desired first choice for a filter and then select the desired filter by tapping on the filter twice (or once or another number of times), for example. In an embodiment, once the x-axis (FIG. 1B) is selected, through a horizontal swipe, the x-axis may then appear in the forefront, and in the forefront, the chosen effect will appear, which may be pre-applied to the photo. Once the x-axis is selected, a user may opt to choose another y-axis effect to apply or complete the process, and proceed to posting, sending, and/or storing the photo selected. Similarly, once the x-axis is selected, a user may opt to choose another y-axis effect to apply, such as dating a photo or hash tagging a photo. Alternatively, the user may search for a dated photo or a hash tagged photo by swiping photos, spinning the rows and columns left, right, up and/or down. One may also swipe the photos in the x and y directions as a method of searching for a photo. In an embodiment, photos may be searched by a series of spin swipes in the x- and y-directions, by selecting the x- and/or y-axis and swiping to navigate through the collection of photos. Optionally, a button or a point that acts as a button (a "button point") may be included which, when selected, adds a hashtag to the photo and/or creates a hash tag from the photo. Although in the above example, one of the axis is mentioned as being in the forefront (e.g. after being selected or activated), in another embodiment, neither axis (and no carousel) needs to appear in the forefront whether or not it is selected or activated.

Selecting from different choices presented in a carousel of choices and tapping on the choice may be applied to selecting other filters and/or other options, such as to select friends or groups to share a photo.

The same progression of selecting from a list of choices arranged in a carousel, may be applied to files and folders. For example, the folders may be represented on the x or y-axis and the files within that folder may be represented on the alternative axis (which is the y or x-axis, respectively).

The methods disclosed herein facilitate viewing complex subject matter and navigating a complex array of content on a small screen, faster and more efficiently.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
receiving, at a machine, information indicating a swipe gesture over a frame having content, the swipe gesture being in a direction, the machine including a processor system having one or more processors and a memory system;
in response, presenting by the processor system, on a screen, an image of frames of content moving, arranged to convey a visual perception of a carousel holding the frames rotating about an axis perpendicular to the direction; and
presenting on a display of the machine an image having a main frame surrounded by four border panels;
wherein
the frames are capable of storing content, the content including photos,
the content including content that any of the frames are capable of storing, which includes
a folder, and
other types of content other than a folder; and
wherein
only a portion of the carousel is visible on the screen and, during a mode in which details of content of individual frames of the carousel are viewable, in the portion of the carousel that is visible more than one frame of the carousel is visible, wherein when a frame of the carousel is centered in a display area of the screen for viewing content of that frame, only one version of the frame is displayed and at least a portion of each of at least two other frames of the carousel is visible; and
each border panel including a preview of content that is adjacent to the main frame, the content that is adjacent to the main frame being adjacent along a direction of rotation in which one of a first carousel and a second carousel rotates.

2. The method of claim 1, further comprising:
receiving, at the machine, a rotation gesture on one of the frames; and
in response, presenting, by the machine, on the screen, an image of the content rotated in the direction and by a degree of rotation indicated by a rotational movement of a user, the rotational movement being part of the rotation gesture.

3. The method of claim 1, further comprising:
receiving, at the machine, a gesture activating a panoramic function; and
in response, presenting, by the machine, on the screen, an image of a still panoramic picture, with different portions of the still panoramic picture located in different frames of the carousel.

4. The method of claim 3, further comprising:
receiving, at the machine, an indication of which picture to combine to create a panoramic image.

5. The method of claim 3, further comprising:
receiving, at the machine, a gesture activating a pinning function; and
in response, presenting by the machine, activating a method for adding an augmented object to the image.

6. The method of claim 5, further comprising:
receiving, at the machine, an indication of which of a plurality of augmented objects to include in the image.

7. The method of claim 1, wherein the content includes the photos, and in at least one mode of operation rotation of a carousel of filters changes a filter applied to an image that is applied to at least one frames from one filter to another filter, the carousel of filters being superimposed over the frames having content.

8. The method of claim 1, wherein
a grid of frames appears on the screen, and
rotation of a carousel in the direction causes all the frames of the grid appear to rotate in tandem in the direction.

9. The method of claim 1, wherein
a grid of frames of the content appears on the screen, the grid being formed from multiple independent carousels that are parallel to the first direction and multiple independent carousels that are parallel to the second direction; and
in a mode of operation,
rotation of a carousel in the first direction causes all the frames of the grid to rotate in tandem in the first direction, and
rotation of a carousel in the second direction causes all the frames of the grid to rotate in tandem in the second direction.

10. The method of claim 9, wherein the first carousel is parallel to at least a third carousel,
the third carousel is perpendicular to the second carousel, the second carousel is parallel to at least a fourth carousel, the fourth carousel is perpendicular to the first carousel, and
the first carousel and third carousel each intersect the second and fourth carousels; and
where
the grid is formed from at least multiple carousels parallel to the first direction, which include the first carousel and the third carousel, and
the grid also includes at least multiple carousels parallel to the second direction, which include the second carousel and the fourth carousel.

11. The method of claim 1, wherein the content includes images, in a first mode the rotation of the carousel causes the image of frames of content to move and in a second mode rotation of the carousel changes a filter applied to the image of the frames of the content from one filter to another filter.

12. The method of claim 1, the image of frames of content moving including a link for causing a selected image to fill the screen.

13. The method of claim 1, wherein
the at least two other frames are foreshortened, so that a first end of each of the at least other two frames is narrower than a second end of each of the at least two other frames, and
the first end and the second end being opposite to one another and being parallel to one another.

14. A method comprising:
receiving, at a machine, information indicating a swipe gesture in a first direction, the swipe gesture in the first direction being over a first frame selected from a first plurality of frames of content, the content including photos, the machine including a processor system having one or more processors and a memory system;

in response, presenting by the processor system, on a screen an image of the first plurality of frames of content moving, arranged to convey a perception of a first carousel holding the first plurality of frames rotating about an axis perpendicular to the first direction;

receiving at the machine information indicating a swipe gesture in a second direction that is not parallel to the first direction the swipe gesture in the second direction being over a second frame selected from a second plurality of frames of content;

in response, presenting, by the machine, on the screen an image of the second plurality of frames of content moving, arranged to convey a perception of a second carousel holding the second plurality of frames rotating about an axis perpendicular to the second direction, the first plurality of frames and the second plurality of frames sharing only one frame; and during a mode in which details of content of individual frames are viewable, more than one frame is visible, wherein when a frame is centered in a display area of the screen for viewing content of that frame, at least a portion of each of at least two other frames is visible, each of the at least two other frames is foreshortened to create an appearance of a carousel; and wherein the content includes images, and in at least one mode, a rotation inducing gesture in the first direction, causes a rotation in the first direction that changes a filter applied to an image that is at least one frame of a current set of frames from one filter to another filter, wherein the rotation inducing gesture in the first direction that changes the filter is performed over the at least one frame to which the filter is applied, and a rotation inducing gesture in the second direction causes a rotation in the second direction that changes a degree of the filter from one degree of filtering greater than an absence of filtering to another degree of filtering that is greater than an absence of filtering, wherein the rotation inducing gesture in the second direction that changes the degree of the filter is performed over the at least one frame in which the degree of the filter changes.

15. A method comprising:
presenting on a display of a machine an image having a content frame surrounded by border panels, each panel of the border panels being associated with a command, the machine including a processor system having one or more processors and a memory system;

receiving at the machine a gesture over a region associated with content that is surrounded by the border panels the gesture including at least a motion of a portion of a body of a user towards one of the border panels; and in response, invoking by the processor system the command associated with the one of the border panels as indicated by the gesture that was received over the region associated with the content;

the command of each panel of the border panels causing storage of the content in a different destination than commands of other panels of the border panels, wherein at least one destination is a file folder and the method further comprising: as a result of implementing the command having the destination of the file folder, causing the content that is in the content frame to be stored in the file folder.

16. The method of claim 15, the command of each panel of the border panels causing storage of the content in a different destination than commands of other panels of the border panels,
wherein each destination is a social media, and the method further comprising:
as a result of implementing the command, causing an image that is part of the content of the content frame to be posted on a wall of a social network.

17. The method of claim 15, wherein the border panels are a plurality of panes of the content frame, in which each border panel is a pane of the content frame, in which the border panels frame the content.

18. The method of claim 15, wherein the gesture is a swipe in a direction, and in response to the swipe, the processor system selects a command based on the direction of the swipe and which border panel is associated with the direction of the swipe.

19. The method of claim 15, further comprising:
receiving, via the display, a rotation gesture; and
in response, via the machine, rotating locations of the border panels around the content of the content frame, without rotating any visible carousel.

20. The method of claim 19, the border panels comprising:
a top horizontal border panel,
a bottom horizontal border panel,
a left vertical border panel, and
a right vertical border panel,
the border panels do not obscure the content frame and a screen space occupied the border panels is less a screen space occupied the content frame.

21. The method of claim 19, the rotation gesture including a rotational motion of fingers of the user.

22. The method of claim 19, the rotating locations of the border panels around the content of the content frame causes a first border panel, which is one of the border panels to disappear, and a second border panel to appear instead, the first border panel being associated with a first command and the second border panel being associated with a second command that was not associated with the border panels prior to the rotating of the locations of the border panels.

* * * * *